United States Patent
Kingston et al.

(10) Patent No.: US 8,954,832 B1
(45) Date of Patent: Feb. 10, 2015

(54) ASYMMETRIC DISTANCE CODING

(75) Inventors: Samuel C. Kingston, Salt Lake City, UT (US); Radivoje Zarubica, Salt Lake City, UT (US); Thomas R. Giallorenzi, Salt Lake City, UT (US); N. Thomas Nelson, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 114 days.

(21) Appl. No.: 13/603,843

(22) Filed: Sep. 5, 2012

(51) Int. Cl.
*G06F 11/10* (2006.01)

(52) U.S. Cl.
USPC .......................................................... 714/807

(58) Field of Classification Search
USPC .......................................................... 714/807
See application file for complete search history.

(56) References Cited

U.S. PATENT DOCUMENTS

| | | | |
|---|---|---|---|
| 5,048,023 A | | 9/1991 | Buehler et al. |
| 5,289,501 A | * | 2/1994 | Seshadri et al. ............... 375/286 |
| 5,533,035 A | * | 7/1996 | Saxena et al. .................. 714/761 |
| 2007/0198878 A1 | | 8/2007 | Dei |
| 2011/0214037 A1 | | 9/2011 | Okamura et al. |

OTHER PUBLICATIONS

Author: Hendrick C. Ferreira; Title: Lower Bounds on the Minimum Hamming Distance Achievable With Runlength Constrained or DC Free Block Codes and the Synthesis of a (16,8) Dmin=4 DC Free Block Code; Pubsher IEEE vol. Mag-20, No. 5, Date: Sep. 1984.*
Chase, "A Class of Algorithms for Decoding Block Code With Channel Measurement Information," IEEE Transactions on Information Theory, vol. IT-18, No. 1 (Jan. 1982), pp. 170-182.
Dumer et al., "Soft-Decision Majority Decoding of Reed-Muller Codes," IEEE Transactions on Information Theory, vol. 46, No. 1 (Jan. 2000), pp. 258-264.
Kampf et al., "The Euclidean Algorithm for Generalized Minimum Distance Decoding of Reed-Solomon Codes," Dept. of Telecommunications and Applied Information Theory, Univeristy of Ulm, Germany (date unknown).
Lin et al., "Error control coding: fundamentals and applications," Prentice-Hall (1983) (1 page).
Pyndiah et al., "Near Optimum Decoding of Product Codes," Telecom Bretagne, France (IEEE 1994), pp. 339-343.
www.aha.com (AHA products group) (date unknown) 2 pages.

* cited by examiner

*Primary Examiner* — April Y Blair
*Assistant Examiner* — Thien D Nguyen
(74) *Attorney, Agent, or Firm* — Kirton | McConkie

(57) ABSTRACT

A digital electronic message comprising datawords to be transmitted in a communications system can be encoded prior to transmission using an asymmetric error detection coding scheme. The coding scheme is asymmetric because the coding scheme includes multiple codeword groups each with a different minimum coding distance. The codewords in a group having a greater minimum coding distance can correspond to datawords that have a relatively high susceptibility to transmission errors. The codewords in a group having a lesser minimum coding distance can correspond to datawords that have a relatively low susceptibility to transmission errors.

23 Claims, 12 Drawing Sheets

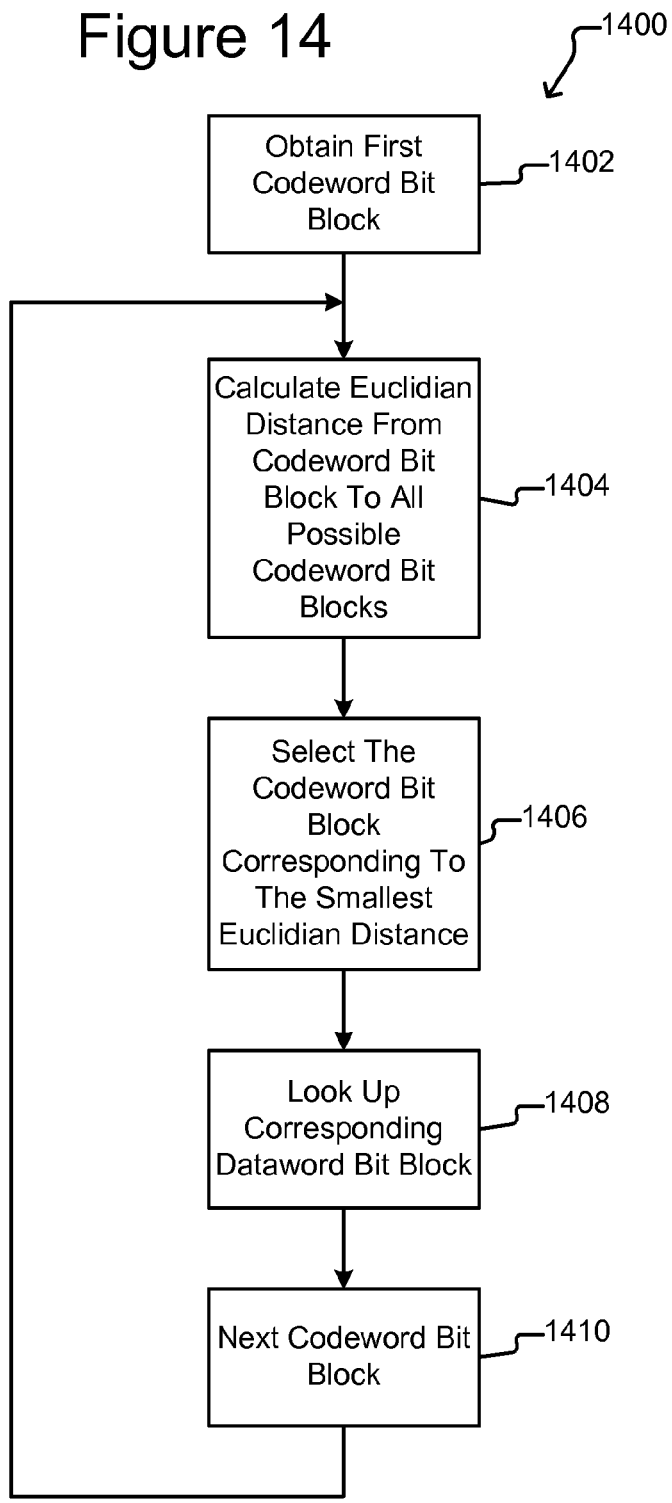

ASYMMETRIC DISTANCE CODING

BACKGROUND

The present invention relates generally to the field of error detection coding and decoding.

As is known, in the field of electronic communications, digital information can be encoded and electronically transmitted through a transmission medium to a receiver, where the digital information is decoded. Noise and other factors, however, can cause errors in the digital information. The digital information received and decoded at the receiver can thus have errors. To detect and, in some cases, correct such errors, the digital information can be encoded with error detection coding before transmission. A variety of error detection coding techniques are known, including error detection coding that falls into the general categories of linear block coding and convolution coding. Typically, all such error detection coding involves encoding the digital information into codewords that include additional or redundant data bits that facilitate detecting and, in some instances, correcting transmission errors in the digital information.

One measure of the potential effectiveness of an error detection coding technique is the "minimum coding distance" among the codewords. Generally speaking, the greater the minimum coding distance, the greater the error detection and correction potential of a coding technique. The minimum coding distance, however, can also affect the coding efficiency. For a coding technique that uses codewords of a particular length, the greater the minimum coding distance, the fewer the number of the codewords that the coding technique can use to encode the digital information. Thus, while an increase in minimum coding distance increases the error detection and correction capability of a coding technique, the increase in minimum coding distance decreases the efficiency of the coding technique. Embodiments of the present invention address this and/or other problems in prior art error detection coding techniques.

SUMMARY

In some embodiments of the invention, a process of encoding datawords using asymmetric distance coding can include receiving at an electronic encoder a message comprising datawords from a dataword set for transmission in an electronic transmission system. The dataword set can include a first dataword group and a second dataword group. The first dataword group can consist of datawords with a greater susceptibility to transmission errors than datawords of the second dataword group. The process can also include encoding with the electronic encoder datawords in the message that are in the first dataword group into corresponding codewords from a first codeword group of a codeword set, and the process can further include encoding datawords of the message that are in the second dataword group into corresponding digital codewords from a second codeword group of the codeword set. The second codeword group can have a second minimum coding distance that is less than a first minimum coding distance of the first codeword group.

Some embodiments of the invention can be directed to an encoder for encoding datawords of a dataword set for transmission in an electronic transmission system. The dataword set can include a first dataword group and a second dataword group. The first dataword group can consist of datawords with a greater susceptibility to transmission errors than datawords of the second dataword group. The encoder can include an input for receiving a message comprising the datawords, circuitry configured to encode the datawords into codewords, and an output for outputting an encoded message that includes the codewords. The circuitry can be configured to encode datawords in the message that are in the first dataword group into corresponding codewords from a first codeword group of a codeword set, and the circuitry can encode datawords of the message that are in the second dataword group into corresponding codewords from a second codeword group of the codeword set. The second codeword group can have a second minimum coding distance that is less than a first minimum coding distance of the first codeword group.

In some embodiments of the invention, a process of decoding an encoded message can include receiving an encoded message transmitted in an electronic transmission system. The process can also include determining whether each of the codewords in the message is in a first codeword group or a second codeword group of a codeword set. The first codeword group can have a first minimum coding distance, which can greater minimum than a minimum coding distance of the second codeword group. The process can further include decoding the received codewords determined to be in the first codeword group into corresponding datawords in a first dataword group of a dataword set, and the process can also include decoding the received codewords determined to be in the second codeword group into corresponding datawords in a second dataword group of the dataword set. The datawords in the first dataword group can have a susceptibility to transmission errors in the transmission system that is greater than or equal to a threshold error susceptibility, and the datawords in the second dataword group can have a susceptibility to transmission errors that is less than the threshold error susceptibility.

BRIEF DESCRIPTION OF THE DRAWINGS

FIG. 14 illustrates an example of a process for decoding a codeword encoded as shown in FIG. 10 according to some embodiments of the invention.

DETAILED DESCRIPTION OF EXEMPLARY EMBODIMENTS

Figure 1:
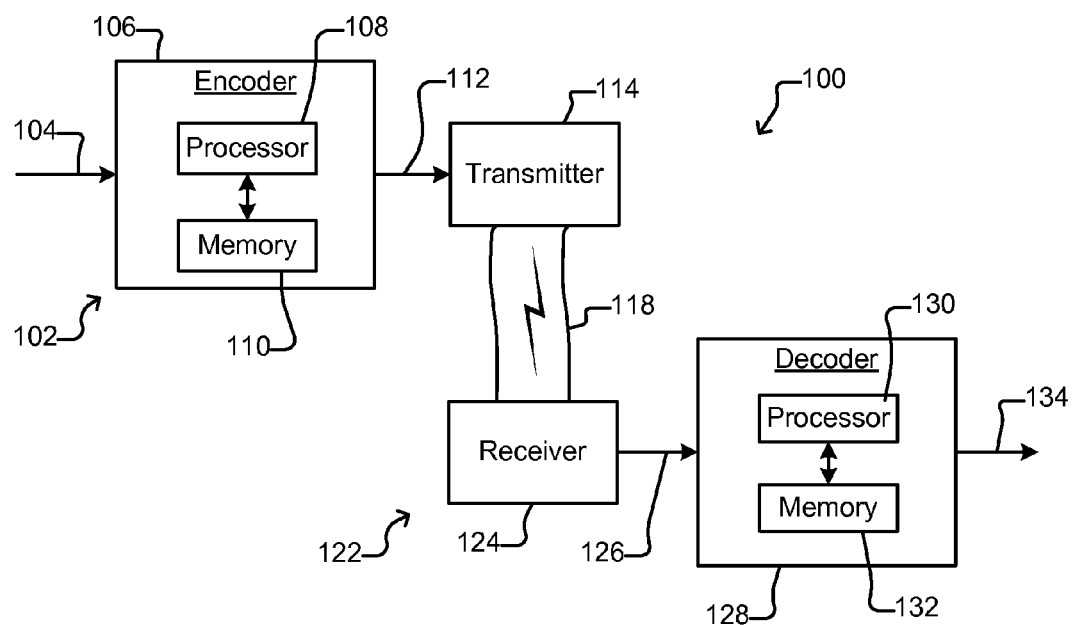
FIG. 1 shows an example of a communications system for encoding an electronic message using asymmetric distance coding, transmitting the encoded message, and decoding the received encoded message according to some embodiments of the invention.

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "ones" means more than one.

As used herein, a "dataword" is a plurality of bits that represent information content.

The term "bit" is used herein to refer to a binary digit that has two and only two possible states: a "low" state, and a "high" state. The term "one" with reference to a bit means the high state, and the term "zero" with reference to a bit means the low state. As used herein, a "first" state of a bit refers to either the high (e.g., one) state or the low (e.g., zero) state of the bit, and a "second" state of the bit refers to the opposite state (i.e., the low or zero state if "first" state refers to the high or the high or one state of the bit if "first" state refers to the low or zero state of the bit).

As used herein, a "codeword" is a plurality of bits that both encode a dataword and provide error detection capability to detect and, optionally, correct transmission errors in the codeword at the receiver after the codeword has been transmitted through a transmission medium and received at a receiver.

As used herein, the "coding distance" between two codewords (i.e., a pair of codewords) is the number of bits that are different in one of the codewords as compared to the other codeword.

As used herein, the "minimum coding distance" of a group of codewords consisting of a subset of the codewords in a codeword set is the smallest coding distance between every possible pair of codewords consisting of each and every codeword in the group and each and every other codeword in the codeword set.

As used herein, a "set of datawords" or a "dataword set" refers to a closed set of multiple, predefined datawords each of which has a different pattern of bits. A "set of codewords" or a "codeword set" is a closed set of multiple codewords in which there is one codeword for each dataword in a corresponding dataword set, and each codeword in the set has a different pattern of bits.

As used herein, "transmission" means transmission of a signal by an electronic or electromagnetic transmitter through a transmission medium to an electronic or electromagnetic receiver.

As used herein, a "transmission error" or "transmission errors" mean errors that arise in a signal into which a dataword is encoded during transmission of the signal. Such errors can arise in the transmitter that transmits the signal, from the transmission medium through which the signal is transmitted, and/or in the receiver that receives the signal.

Embodiments of the invention utilize asymmetric distance coding to encode and decode electronic messages transmitted in electronic communications systems. The distance coding is termed "asymmetric" because the set of codewords is divided into multiple codeword groups each with a different minimum coding distance. FIG. 1 illustrates an example of an electronic communications system 100 in which the asymmetric error detection coding of the present invention can be used. As shown, the communications system 100 can comprise an electronic transmitting device 102 and a an electronic receiving device 122.

The transmitting device 102 can comprise an electronic encoder 106 and an electronic transmitter 114. The encoder 106 can receive and encode a digital electronic message 104. The output of the encoder 106 can thus be an encoded message 112, which can be transmitted by the transmitter 114 through a transmission medium 118 to the receiving device 122.

The receiving device 122 can comprise an electronic receiver 124 and an electronic decoder 128. The receiver 124 can receive the encoded message 112 transmitted by the transmitter 114 and output the received encoded message 126 to the decoder 128, which can decode the received encoded message 126 into a decoded digital electronic message 134.

As shown, the encoder 106 can comprise a processor 108 (e.g., one or a combination of a digital processor such as a microprocessor, microcontroller, digital signal processor, or the like) and a digital memory 110 (e.g., one or a combination of a semiconductor, magnetic, optical, or the like digital data storage device). In some embodiments, the processor 108 can operate in accordance with software, firmware, or the like stored in the memory 110. The encoder 106 can alternatively or in addition comprise hardwired circuitry (not shown) in place of or in addition to the processor 108.

The transmitter 114 can be any device suitable for transmitting an encoded electronic message 112 through the transmission medium 118. For example, the transmitter 114 can be a wireless radio frequency transmitter, a modem, or the like. The transmission medium 118 can be any medium through which an encoded electronic message 112 can be transmitted.

Examples of the transmission medium 118 include free space, ambient air, electrical cables, electrical wires, optical cables, electromagnetic waveguides, and the like.

Like the encoder 106, the decoder 128 can comprise a processor 130 and a digital memory 132. The processor 130 can be, for example, one or a combination of a digital processor such as a microprocessor, microcontroller, digital signal processor, or the like, and the digital memory 110 can be, for example, one or a combination of a semiconductor, magnetic, optical, or the like digital data storage device. Moreover, the processor 130 can operate in accordance with software, firmware, or the like stored in the memory 132. The decoder 128 can alternatively or in addition comprise hardwired circuitry (not shown) in place of or in addition to the processor 130.

Figure 2:
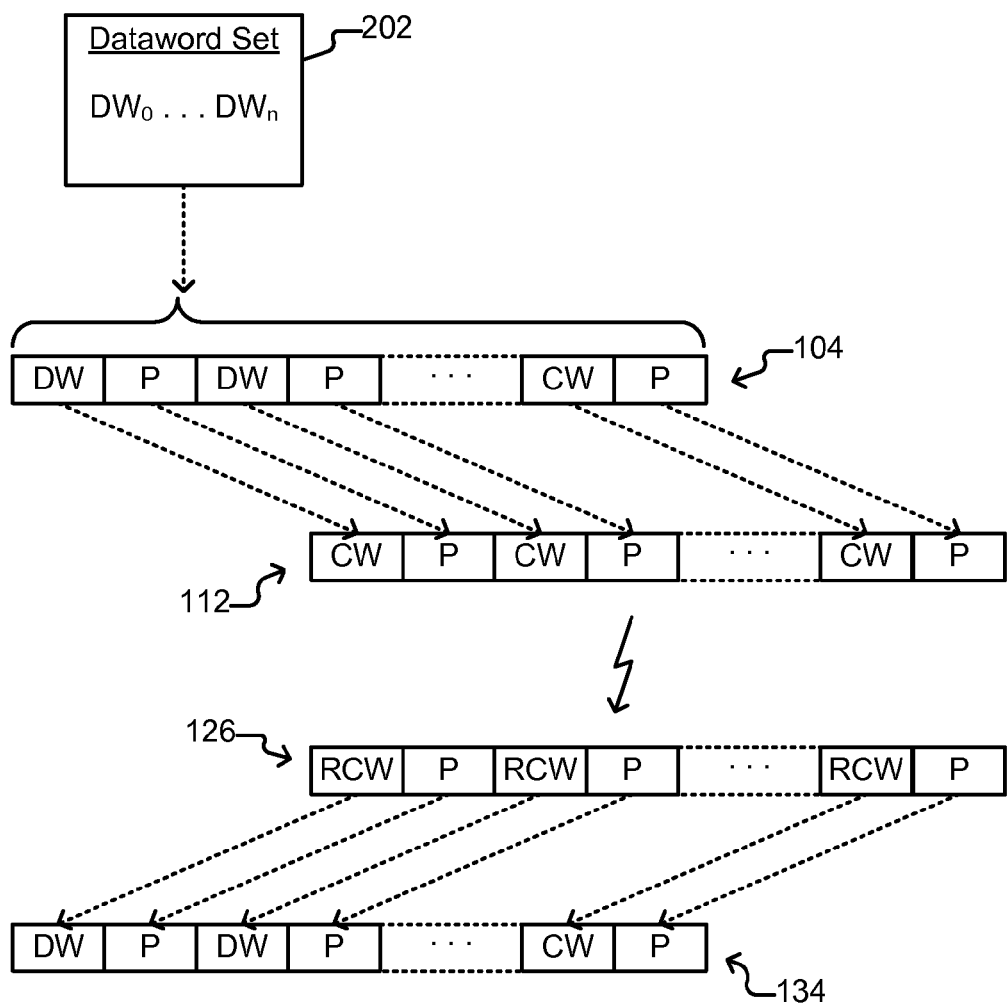
FIG. 2 illustrates an example of a message, an encoded message, a received encoded message, and an decoded message according to some embodiments of the invention.

As shown in FIG. 2, the message 104 received at the encoder 106 (see also FIG. 1) can comprise one or more datawords DW. Each dataword DW can be one of the datawords of a dataword set 202 consisting of "n" number of predefined datawords $DW_0 \ldots DW_n$. That is, dataword set 202 can consist of a predetermined, finite set of "n" number of predefined datawords $DW_0 \ldots DW_n$. The datawords DW in each message 104 input into the communications system 100 can be one of the datawords $DW_0 \ldots DW_n$ of the dataword set 202. As shown, the message 104 can also include other data. For example, in some embodiments one or more of the datawords DW can be a header comprising parameters regarding a following data payload P, which is not encoded or is encoded in ways other than using the dataword set 202. Alternatively, the message 104 can consist solely of datawords DW from the dataword set 202.

As noted above, a "dataword" consists of a plurality of bits that represent information content. Each dataword $DW_0 \ldots DW_n$ can have the same bit length (i.e., the same number of bits), but the bit pattern of each dataword $DW_0 \ldots DW_n$ in the dataword set 202 can be different. The datawords $DW_0 \ldots DW_n$ can represent any suitable information. For example, the datawords $DW_0 \ldots DW_n$ can represent message headers, alpha-numeric characters, control codes, and/or the like.

As noted above, the encoder 106 encodes the message 104 into an encoded message 112. As illustrated in FIG. 2, this can comprise encoding each dataword DW in the message 104 into a corresponding codeword CW. The transmitter 114 can then transmit the encoded message 112 through the transmission medium 118 to the receiver 124, which can output the received encoded message 126 to the decoder 128. The codewords CW in the received encoded message 126 are designated RCW in FIG. 2. As is known, the circuitry of the transmitter 114, the transmission medium 118, the circuitry of the receiver 124, and/or the like can introduce transmission errors into transmissions between the transmitting device 102 and the receiving device 122 in FIG. 1. It is thus possible that one or more of the received codewords RCW contains transmission errors. The codewords CW can therefore include, in addition to a corresponding encoded dataword DW, error detection and, optionally, correction information that can facilitate the detection and, optionally, correction at the receiving device 122 of transmission errors in the encoded message 126 received at the receiving device 122. The received codewords RCW in the received encoded message 126 can thus be decoded by the decoder 128 into a decoded message 134 comprising the original datawords DW despite transmission errors in the received codewords RCW.

Some of the datawords $DW_0 \ldots DW_n$ in the dataword set 202 can be more susceptible to transmission errors than others of the datawords $DW_0 \ldots DW_n$. This can arise, for example, due to differences in the bit patterns of the datawords $DW_0 \ldots DW_n$. For example, the signal-to-noise ratio of the transmitted waveforms of some of the datawords $DW_0 \ldots DW_n$ can be different than the signal-to-noise ratio of the waveforms of others of the datawords $DW_0 \ldots DW_n$. As is known, the lower the signal-to-noise ratio, the higher the susceptibility of the corresponding waveform to transmission errors. Thus, the lower the signal-to-noise ratio that corresponds to a dataword $DW_0 \ldots DW_n$, the higher the susceptibility of the dataword $DW_0 \ldots DW_n$ to transmission errors.

The datawords $DW_0 \ldots DW_n$ of the dataword set 202 can accordingly be divided into groups that correspond to relative susceptibility of the datawords $DW_0 \ldots DW_n$ to transmission errors. The codewords CW that correspond to the datawords $DW_0 \ldots DW_n$ can likewise be divided into corresponding groups with different minimum coding distances.

Figure 3:
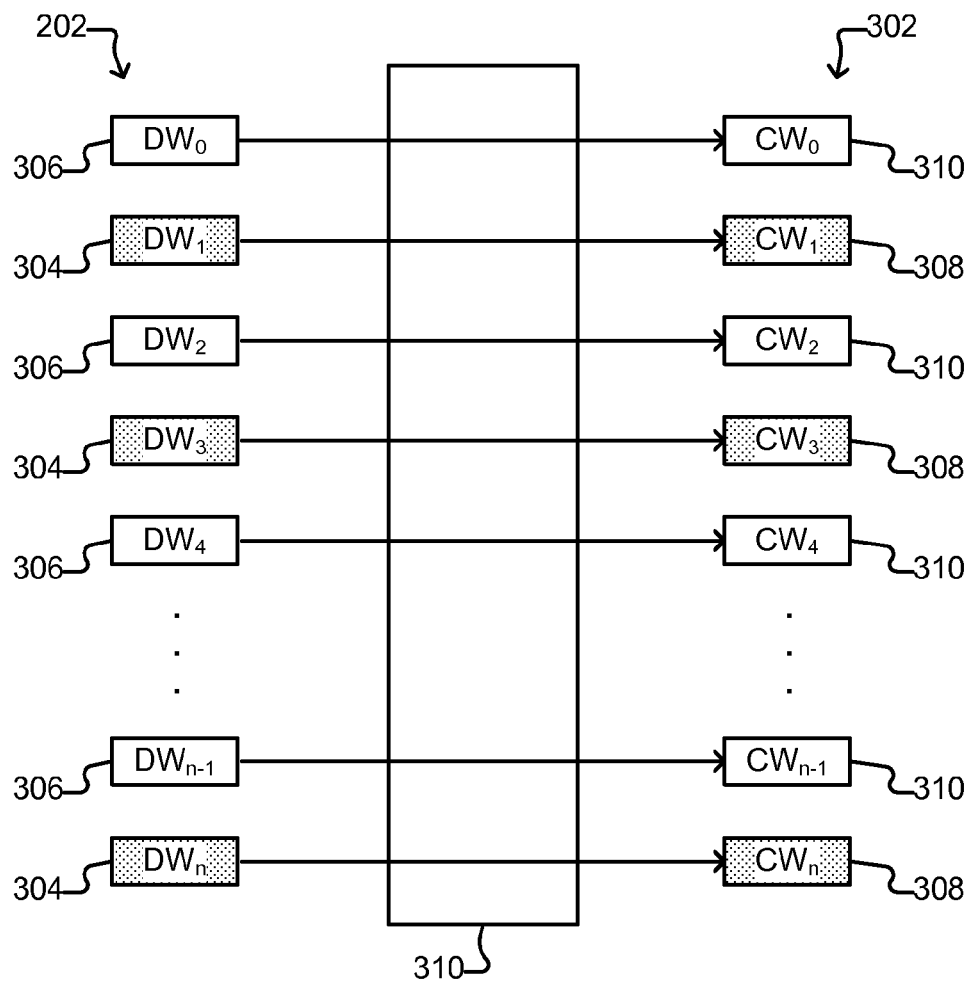
FIG. 3 shows an example of an asymmetric distance coding scheme according to some embodiments of the invention.

FIG. 3 illustrates the dataword set 202 and a corresponding codeword set 302. As shown, the codeword set 302 can consist of codewords $CW_0 \ldots CW_n$, and each such codeword $CW_0 \ldots CW_n$ can correspond to one of the datawords $DW_0 \ldots DW_n$ in the dataword set 202 in accordance with an encoding algorithm 310. That is, the encoding algorithm 310 can uniquely map each dataword $DW_0 \ldots DW_n$ in the dataword set 202 to one of the codewords $CW_0 \ldots CW_n$ in the codeword set 302 such that each dataword $DW_0 \ldots DW_n$ maps to one and only one of the codewords $CW_0 \ldots CW_n$, and there is one and only one codeword $CW_0 \ldots CW_n$ for each dataword $DW_0 \ldots DW_n$.

The encoder 106 of FIG. 1 can encode each dataword DW in the message 104 into a corresponding codeword $CW_0 \ldots CW_n$ in the codeword set 302 in accordance with the encoding algorithm 310 as shown in FIG. 3. The encoding algorithm 310 can be any suitable algorithm (e.g., technique, scheme, process, or the like) for mapping the datawords $DW_0 \ldots DW_n$ of the dataword set 202 to the codewords $CW_0 \ldots CW_n$ of the codeword set 302. For example, the encoding algorithm 310 can comprise a look-up table in which each dataword $DW_0 \ldots DW_n$ is mapped to one of the codewords $CW_0 \ldots CW_n$. Such a look-up table can be stored, for example, in the digital memory 110 and/or digital memory 132 of FIG. 1. As another example, the encoding algorithm 310 can comprise a linear block coding process. As yet another example, the encoding algorithm 310 can comprise a convolution coding process. As yet another example, the encoding algorithm 310 can comprise a combination of two or more of the foregoing examples of table-look-up, linear block coding, and/or convolution coding.

As noted, the susceptibility of the datawords $DW_0 \ldots DW_n$ of the dataword set 202 to transmission errors can be different one from another. In the example illustrated in FIG. 3, the datawords $DW_0 \ldots DW_n$ are divided into two groups (termed "dataword groups" herein): a first dataword group 304 consisting solely of the datawords $DW_1$, $DW_3$, and $DW_n$ that have a relatively higher susceptibility to transmission errors than a second dataword group 306 consisting solely of datawords $DW_0$, $DW_2$, and $DW_4$ through $DW_{n-1}$, which have a relatively lower susceptibility to transmission errors. The number of dataword groups, the number of datawords in each group, and the specific datawords in each group are examples and provided solely for ease of illustration and discussion and not by way of limitation.

In some embodiments, the susceptibility to transmission errors of the datawords $DW_1$, $DW_3$, and $DW_n$ of the first dataword group 304 can each be greater than or equal to a predetermined threshold error-susceptibility value, and the susceptibility to transmission errors of the datawords $DW_0$, $DW_2$, and $DW_4 \ldots DW_{n-1}$ of the second dataword group 306 can each be less than the threshold error-susceptibility value. As noted above, in some embodiments, the error-susceptibility of a dataword can correspond to a signal-to-noise ratio of the transmission waveform of a dataword $DW_0 \ldots DW_n$, which can correspond to the particular bit pattern of the data word $DW_0 \ldots DW_n$. Thus, in some embodiments, the signal-to-noise ratio of the transmission waveforms (and thus the bit patterns) of the datawords $DW_1$, $DW_3$, and $DW_n$ of the first dataword group 304 can each be less than or equal to a predetermined threshold signal-to-noise ratio, and the signal-to-noise ratio of the transmission waveforms (and thus the bit patterns) of the datawords $DW_0$, $DW_2$, and $DW_4 \ldots DW_{n-1}$ of the second dataword group 306 can each be greater than the threshold signal-to-noise ratio.

The codewords $CW_0 \ldots CW_n$ of the codeword set 302 can likewise be divided into similar corresponding groups (termed "codeword groups" herein). That is, codewords $CW_1$, $CW_3$, and $CW_n$ (which correspond to the datawords $DW_1$, $DW_3$, and $DW_n$ of the first dataword group 304) can be in a first codeword group 308 of the codeword set 302. The other codewords $CW_0$, $CW_2$, and $CW_4 \ldots CW_{n-1}$ (which correspond to the datawords $DW_0$, $DW_2$, and $DW_4, \ldots DW_{n-1}$ of the second dataword group 306) can be in a second codeword group 3010 of the codeword set 302. The codewords $CW_0 \ldots CW_n$ of the codeword set 302 can thus be divided into codeword groups that correspond to the dataword groups 306 and 308 of the dataword set 202.

Because the dataword groups 304 and 306 of the dataword set 202 consist of a first dataword group 304 with a relatively high susceptibility to transmission errors and a second dataword group 306 with a relatively low susceptibility to transmission errors, the corresponding codeword groups 308 and 310 of the codeword set 302 can have different levels of error protection. That is, the first codeword group 308 consisting of codewords $CW_1$, $CW_3$, and $CW_n$ can provide a relatively high level of error protection for the first dataword group 304, and the second codeword group 310 consisting of codewords $CW_0$, $CW_2$, and $CW_4 \ldots CW_{n-1}$ can provide a relatively lower level of error protection for the second dataword group 306.

In some embodiments, the minimum coding distance of the first codeword group 308 consisting of codewords $CW_1$, $CW_3$, and $CW_n$ can be greater than the minimum coding distance of the second codeword group 310 consisting of codewords $CW_0$, $CW_2$, and $CW_4 \ldots CW_{n-1}$. For example, the minimum coding distance of the first codeword group 308 can be at least two, three, four, five, ten, or more bits greater than the minimum coding distance of the second codeword group 310. Thus, the difference between the minimum coding distance of the first codeword group 308 and the minimum coding distance of the second codeword group 310 can be at least two, three, four, five, ten, or more bits. As another example, the minimum coding distance of the second codeword group 310 can be less than ninety percent, eighty-five percent, eighty percent, or seventy-five percent of the minimum coding distance of the first codeword group 308.

Figure 4:
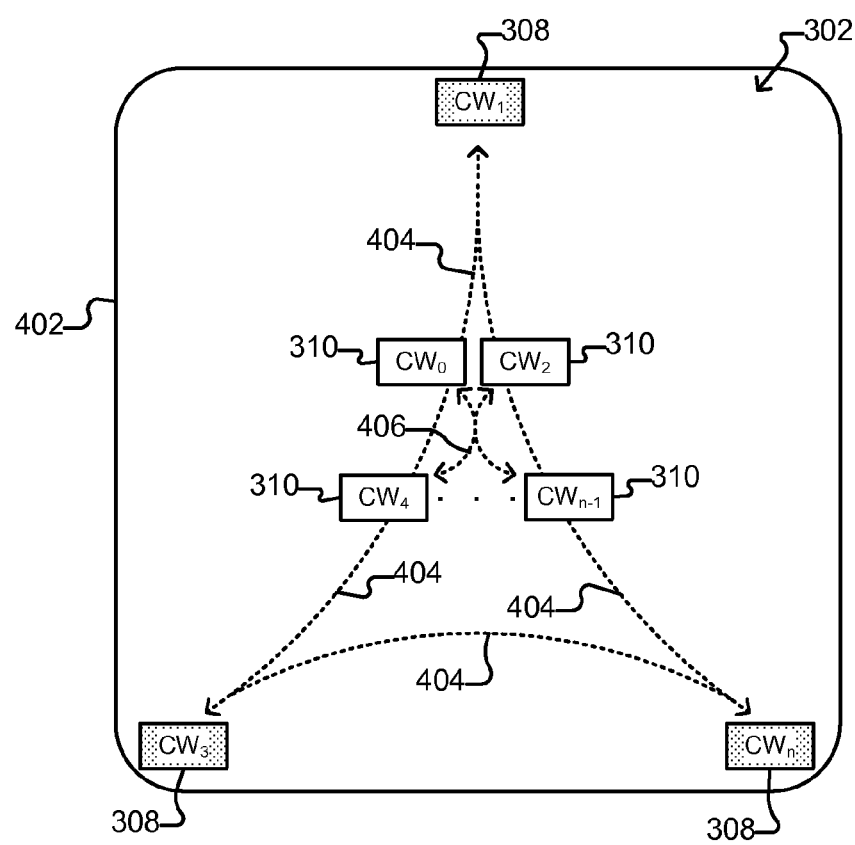
FIG. 4 shows an example of placement of the coding set in a coding space such that a first group of the codewords has a relatively higher minimum coding distance and a second group of the codewords has a relatively lower minimum coding distance according to some embodiments of the invention.

The foregoing can be accomplished by proper placement of the codewords $CW_0 \ldots CW_n$ of the codeword set 302 in the codeword space of the codeword set 302. FIG. 4 illustrates an example placement of the codewords $CW_0 \ldots CW_n$ of the codeword set 302 in a codeword space 402.

All of the codewords $CW_0 \ldots CW_n$ of the codeword set 302 can have the same bit length (i.e., the same number of bits). That is, each codeword $CW_0 \ldots CW_n$ can consist of "m" number of bits. The codeword space 402 of the codeword set 302 can consist of all possible bit patterns for codewords of bit length "m." That is, the codeword space 402 can consist of the $2^m$ possible codewords for a given codeword bit length of "m."

As illustrated in FIG. 4, each codeword $CW_1$, $CW_3$, and $CW_n$ in the first codeword group 308 of the codeword set 302 can be placed in the codeword space 402 such that the first codeword group 308 has a first minimum coding distance 404. In accordance with the definition of "minimum coding distance" provided above, the first minimum coding distance 404 is the smallest coding distance between every possible pair of codewords consisting of each and every codeword $CW_1$, $CW_3$, and $CW_n$ in the first codeword group 308 paired with and each and every other codeword $CW_0$, $CW_1$, $CW_2$, $CW_3$, $CW_4$, $CW_{n-1} \ldots CW_n$ in the codeword set 302 including each and every other codeword in the first codeword group 308. That is, the minimum coding distance 404 of the first codeword group 308 is the smallest of the following coding distances: the coding distance between the codewords $CW_1$ and $CW_3$; the coding distance between the codewords $CW_3$ and $CW_n$; the coding distance between the codewords $CW_n$ and $CW_1$; all the coding distances between the codeword $CW_1$ and each codeword $CW_0$, $CW_2$, and $CW_4 \ldots CW_{n-1}$ in the second codeword group 310; all the coding distances between the codeword $CW_3$ and each codeword $CW_0$, $CW_2$, and $CW_4 \ldots CW_{n-1}$ in the second codeword group 310; and all the coding distances between the codeword $CW_n$ and each codeword $CW_0$, $CW_2$, and $CW_4 \ldots CW_{n-1}$ in the second codeword group 310.

The first minimum coding distance 404 can be selected in accordance with the susceptibility to transmission errors of the datawords $DW_1$, $DW_3$, and $DW_n$ of the first dataword group 304. For example, the first minimum coding distance 404 can be selected to detect and, optionally, correct a desired percentage (e.g., at least sixty percent, at least seventy percent, at least seventy-five percent, at least eighty percent, at least ninety percent, at least ninety-five percent, at least ninety-eight percent, or more) of transmission errors likely to occur in transmission of the datawords $DW_1$, $DW_3$, and $DW_n$ of the first dataword group 304.

As also shown in FIG. 4, each codeword $CW_0$, $CW_2$, and $CW_4 \ldots CW_{n-1}$ in the second codeword group 310 can be placed in the codeword space 402 such that the second codeword group 310 has a second minimum coding distance 406. In accordance with the definition of "minimum coding distance" provided above, the second minimum coding distance 406 is the smallest coding distance between every possible pair of codewords consisting of each and every codeword $CW_0$, $CW_2$, and $CW_4 \ldots CW_{n-1}$ in the second codeword group 306 paired with each and every other codeword $CW_0$, $CW_1$, $CW_2$, $CW_3$, $CW_4$, $CW_{n-1} \ldots CW_n$ in the codeword set 302 including each and every other codeword in the second codeword group 310. That is, the minimum coding distance 406 of the second codeword group 310 is the smallest of the following coding distances: all the coding distances between each and every pair of the codewords $CW_0$, $CW_2$, and $CW_4 \ldots CW_{n-1}$ in the second codeword group 310; all the coding distances between each codeword $CW_0$, $CW_2$, and $CW_4 \ldots CW_{n-1}$ in the second codeword group 310 and the codeword $CW_1$; all the coding distances between each codeword $CW_0$, $CW_2$, and $CW_4 \ldots CW_{n-1}$ in the second codeword group 310 and the codeword $CW_3$; and all the coding distances between each codeword $CW_0$, $CW_2$, and $CW_4 \ldots CW_{n-1}$ in the second codeword group 310 the codeword $CW_n$.

The second minimum coding distance 406 can be selected in accordance with the susceptibility to transmission errors of the datawords $DW_0$, $DW_2$, and $DW_4 \ldots DW_{n-1}$ of the second dataword group 306. For example, the second minimum coding distance 406 can be selected to detect and, optionally, correct a desired percentage (e.g., at least sixty percent, at least seventy percent, at least seventy-five percent, at least eighty percent, at least ninety percent, at least ninety-five percent, at least ninety-eight percent, or more) of transmission errors likely to occur in transmission of the datawords $DW_0$, $DW_3$, and $DW_4 \ldots DW_{n-1}$ of the second dataword group 306. Because, as discussed above, the susceptibility to transmission errors of the datawords $DW_0$, $DW_2$, and $DW_4 \ldots DW_{n-1}$ of the second dataword group 306 is less than the susceptibility to transmission errors of the datawords $DW_1$, $DW_3$, and $DW_n$ of the first dataword group 308, the second minimum coding distance 406 can be less than the first minimum coding distance 404.

Among other possible advantages, configuring the second minimum coding distance 406 to be less than the first minimum coding distance 404 allows for an efficient use of the coding space 402. For example, the higher minimum coding distance of the first minimum coding distance 404 provides higher error protection for the datawords that are the most susceptible to transmission errors. The lower minimum coding distance of the second minimum coding distance 406 allows for more codewords to be utilized in the codeword space 402 than would otherwise be possible if the second minimum coding distance 406 were equal to the first minimum coding distance 404.

Figure 5:
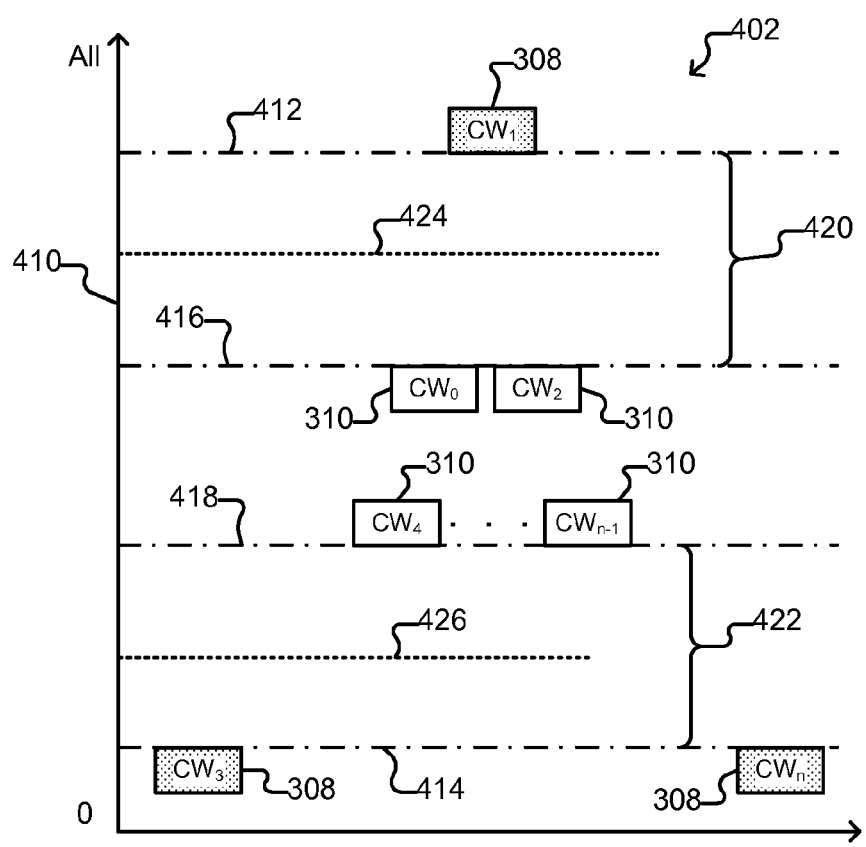
FIG. 5 shows another depiction of the coding space illustrating bit gaps between the first group of codewords and the second group of codewords according to some embodiments of the invention.

As illustrated in FIG. 5 (which shows a different view of the coding space 402 than is shown in FIG. 4), the first codeword group 308 and the second codeword group 310 can also be placed in the codeword space 402 with bit gaps 420 and 422 that can be used in some embodiments during decoding to determine whether a particular codeword CW in a received encoded message is in the first codeword group 308 or the second codeword group 310. The placement of the codewords CW illustrated in FIG. 5 is in addition to the placement illustrated in FIG. 4.

In FIG. 5, the vertical axis 410 represents the number of bits in a codeword CW that are in a particular state in the code space 402. For example, the vertical axis 410 can represent the number of bits in a codeword CW that are "ones." At the bottom of the vertical axis 410, a codeword CW has zero bits in the particular state (e.g., that are "ones). The number of bits of a codeword CW in the particular state (e.g., that are "ones) increases moving up the vertical axis 410. At the top of the vertical axis, a codeword CW has all of its bits in the particular state (e.g., that are "ones). For ease of illustration and discussion, the particular state is discussed herein as "one" state, but the particular state can alternatively be a "zero" state. Thus, for purposes of this discussion, the higher a codeword CW is along the vertical axis, the greater the number of bits the codeword CW has in the "one" state. Moreover, none of the bits of a codeword CW at the bottom of the vertical axis 410 in FIG. 5 are "ones," and all of the bits of a codeword CW at the top of the vertical axis 410 are "ones."

FIG. 5 shows a first upper bit boundary 412 and a first lower bit boundary 414 each of which corresponds to a particular number of bits in the "one" state. As shown, each codeword $CW_1$, $CW_3$, and $CW_n$ in the first codeword group 308 can be placed in the codeword space 402 either on or above the first upper boundary 412 or on or below the first lower boundary 414. The number of bits in the "one" state in the bit patterns of each of the codewords $CW_1$, $CW_3$, and $CW_n$ in the first codeword group 308 is thus either greater than or equal to the first upper bit boundary 412 or less than or equal to the first lower bit boundary 414.

FIG. 5 also shows a second upper bit boundary 416 and a second lower boundary 418 each of which also corresponds to a particular number of bits in the "one" state. As shown, each code word $CW_0$, $CW_2$, $CW_4 \ldots CW_{n-1}$ in the second codeword group 310 can be placed in the codeword space 402 on or between the second upper bit boundary 416 and the second lower boundary 418. The number of bits in the "one" state in the bit patterns of each of the codewords $CW_0$, $CW_2$, $CW_4 \ldots CW_{n-1}$ in the second codeword group 310 can thus be equal to or between the second upper bit boundary 416 and the second lower bit boundary 418.

As will be discussed, the decoder 128 in the communications system 100 of FIG. 1 can initially determine whether a codeword CW in an encoded message 126 received at the receiving device 122 is in the first codeword group 308 or the second codeword group 310 by determining whether the number of bits of the codeword CW in the "one" state is greater than or equal to the first upper boundary 412 or less than or equal to the first lower boundary 414 (in which case the codeword CW is in the first codeword group 308) or is equal to or between the second upper boundary 416 and the second lower boundary 418 (in which case the codeword CW is in the second codeword group 310) as shown in FIG. 5.

To accommodate transmission errors, an upper bit gap 420 can be provided between the first upper bit boundary 412 and the second upper bit boundary 416, and a lower bit gap 422 can similarly be provided between the second lower bit boundary 418 and the first lower bit boundary 414 as shown in FIG. 5. The upper bit gap 420 is the difference between the number of bits of the first upper bit boundary 412 and the second upper bit boundary 416, and the lower bit gap 422 is the difference between the number of bits of the second lower bit boundary 426 and the second upper bit boundary 414.

As will be discussed, the decoder 128 in the communications system 100 of FIG. 1 can initially determine whether a codeword CW in an encoded message 126 received at the receiving device 122 is in the first codeword group 308 or the second codeword group 310 by determining whether the number of bits of the codeword CW in the "one" state is between an upper test boundary 424 (which is an integer number) in the upper bit gap 420 and a lower test boundary 426 (which is an integer number) in the lower bit gap 422 as shown in FIG. 5. If so, the codeword CW is in the second codeword group 310; otherwise, the codeword CW is in the first codeword group 308. The upper test boundary 424 can be in approximately the middle of the first bit gap 420, and the lower test boundary 426 can be in approximately the middle of the second bit gap 422 generally as shown in FIG. 5. For example, the upper test boundary 424 can be an integer equal to approximately one half of the upper bit gap 420 plus the second upper bit boundary 416, and the lower test boundary 426 can be an integer equal to approximately one half of the lower bit gap 422 plus the first lower bit boundary 414.

Because of the bit gaps 420 and 422, the decoder 128 of the communications system 100 of FIG. 1 can accurately determine whether a codeword CW in an encoded message 126 received at the receiving device 122 is in the first codeword group 308 or the second codeword group 310 even if some of the bits of the codeword CW are in the wrong state due to transmission errors. In some embodiments, one or both of the bit gaps 420 and 422 can be at least two, four, five, ten, or more bits.

Figure 6:
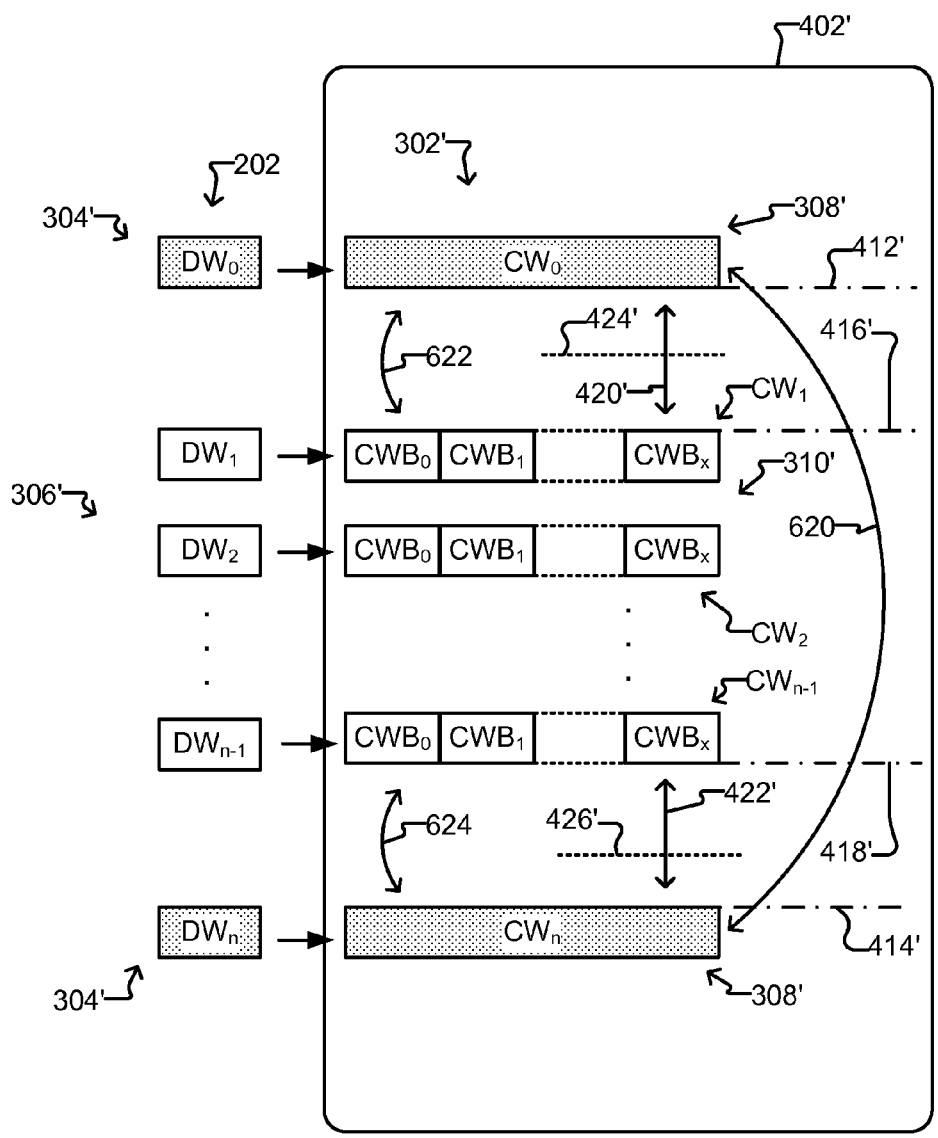
FIG. 6 illustrates an example of the codeword set of FIG. 3 in which the first codeword group comprises two codewords encoded with all ones and all zeros, respectively, and the codewords of a second codeword group all have an equal number of zeros and ones according to some embodiments of the invention.

A general example of the asymmetric coding of the present invention, according to some embodiments of the invention, has been described with respect to FIGS. 3-5. A more specific example of the asymmetric coding of the present invention, according to some embodiments of the invention, will now be described with respect to FIG. 6. FIG. 6 thus illustrates a specific example of the asymmetric coding illustrated in and described above with respect to FIGS. 3-5.

FIG. 6 illustrates an example in which the first dataword group 304' of the dataword set 202 comprises two datawords $DW_0$ and $DW_n$ and the second dataword group 306' comprises the other datawords $DW_1, DW_2 \ldots DW_{n-1}$ according to some embodiments of the invention. Otherwise, the first dataword group 304' has the same characteristics described above for the first dataword group 304, and the second dataword group 306' has the same characteristics described above for the second dataword group 306. For example, the susceptibility to transmission errors of the datawords $DW_0$ and $DW_n$ in the first dataword group 304' is greater than a threshold susceptibility value, and the susceptibility to transmission errors of the $DW_1, DW_2 \ldots DW_{n-1}$ in the second dataword group 306' is less than the threshold susceptibility value as discussed above.

In the examples discussed herein, the susceptibility to transmission errors of a dataword refers to the likelihood of the dataword experiencing an error during transmission. Alternatively, however, the susceptibility to transmission errors of a dataword can refer to the severity of the consequences to the system of a transmission error in the dataword. As yet another alternative, the susceptibility to transmission errors of a dataword can refer to both the likelihood of the dataword experiencing a transmission error and the severity of the consequences of the error to the system.

The first codeword group 308' of the codeword set 302' accordingly has two codewords $CW_0$ and $CW_n$ that correspond to the datawords $DW_0$ and $DW_n$ of the first dataword group 304'. The second codeword group 310' of the codeword set 302' similarly has codewords $CW_1, CW_2 \ldots CW_{n-1}$ that correspond to the datawords $DW_1, DW_2 \ldots DW_{n-1}$ in the second dataword group 306'. Generally as discussed above, the minimum coding distance of the first dataword group 308' is greater than the minimum coding distance of the second dataword group 310'.

Generally in accordance with the definition of "minimum coding distance" provided above, the first minimum coding distance is the smallest coding distance between the codewords $CW_0$ and $CW_n$ in the first codeword group 308' and the coding distances between each of the codewords $CW_0$ and $CW_n$ in the first codeword group 308' and each of the codewords $CW_1, CW_2, \ldots CW_{n-1}$ in the second codeword group 310'.

As noted above the codewords $CW_0 \ldots CW_n$ in the codeword set 302 can be "m" number of bits in length. The two codewords $CW_0$ and $CW_n$ in the first codeword group 308' can be placed in the codeword space 402' with a maximum coding distance 620 from each other. Thus, all "m" bits of the codeword $CW_0$ can be "ones," and all "m" bits of the codeword $CW_n$ can be "zeros" such that the coding distance 620 between the codewords $CW_0$ and $CW_n$ is "m." All of the codewords $CW_1, CW_2 \ldots CW_{n-1}$ of the second codeword group 310' can have an equal number of "zeros" and "ones." This can be accomplished by dividing each of the codewords $CW_1, CW_2 \ldots CW_{n-1}$ of the second codeword group 310' into "x" number of bit blocks $CWB_0, CWB_1 \ldots CWB_x$ as shown in FIG. 6 where "x" is an integer and each bit block $CWB_0, CWB_1 \ldots CWB_x$ has the same number of bits in the "zero" state as in the "one" state. For example, "m" can be an even integer, and "x" can be equal to "m" divided by two times an even integer "I" ($x=m/(2*I)$, where "I" means mathematical division and "*" means mathematical multiplication).

As one example, each bit block $CWB_0, CWB_1 \ldots CWB_x$ can be two bits, and each block $CWB_0, CWB_1 \ldots CWB_x$ can have one of only the following two possible bit patterns: "1, 0"; or "0, 1." As another example, each bit block $CWB_0, CWB_1 \ldots CWB_x$ can be four bits, and each block $CWB_0, CWB_1 \ldots CWB_x$ can have one of only the following possible six bit patterns: "0 0 1 1," "1 1 0 0," "1 0 0 1," "0 1 1 0," "1 0 1 0," and "0 1 0 1." The foregoing are examples only. As yet another example, each bit block $CWB_0, CWB_1 \ldots CWB_x$ can be eight bits, and each block $CWB_0, CWB_1 \ldots CWB_x$ can have one of only the possible bit patterns in which four of the eight bits are "ones" and four are "zeros."

As should be apparent, because the bits of the codewords $CW_0$ and $CW_n$ of the first codeword group 308' are all "ones" and all "zeros" respectively and the bits of each of the codewords $CW_1, CW_2 \ldots CW_{n-1}$ in the second codeword group 310' have an even number of "ones" and "zeros," the minimum coding distance of the first codeword group 308' is one half "m" (where "m" is the number of bits in a codeword CW), the upper bit gap 420' (which has the same characteristics as the upper bit gap 420 discussed above) and the lower bit gap 422' (which has the same characteristics as the lower bit gap 422 discussed above) are also one half "m."

That is, the coding distance 620 between $CW_0$ and $CW_n$ is "m" bits; the coding distance 622 between the codeword $CW_0$ and each codeword $CW_1, CW_2 \ldots CW_{n-1}$ is one half of "m"; and the coding distance 624 between codeword $CW_n$ and each codeword $CW_1, CW_2 \ldots CW_{n-1}$ is also one half of "m." The minimum coding distance of the first codeword group 308' is thus one half of "m" bits as are the upper bit gap '420 and the lower bit gap 422'.

The minimum coding distance of the second dataword group 310' is at least two bits but less than one half of "m" bits. The minimum coding distance of the second dataword group 310' is thus less than the minimum coding distance of the first dataword group 308'.

Figure 7:
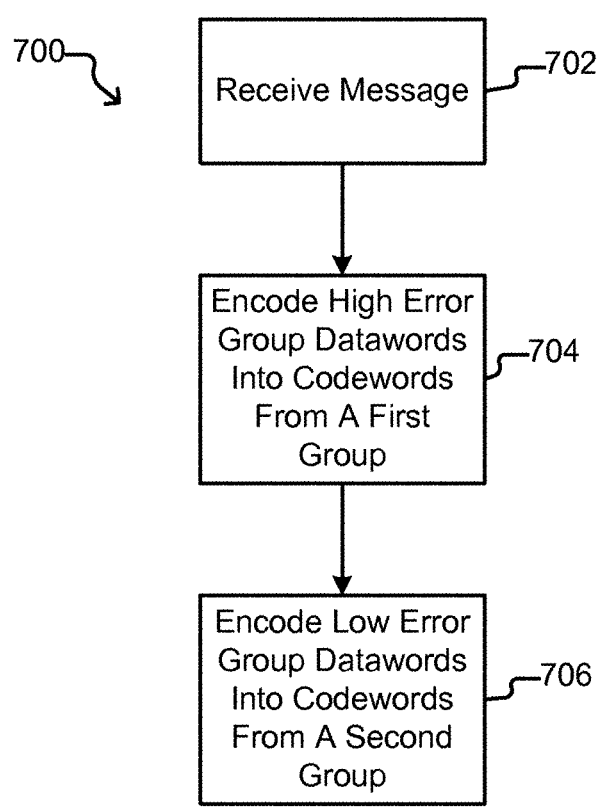
FIG. 7 illustrates an example of a process for encoding a message using asymmetric distance coding according to some embodiments of the invention.
Figure 11:
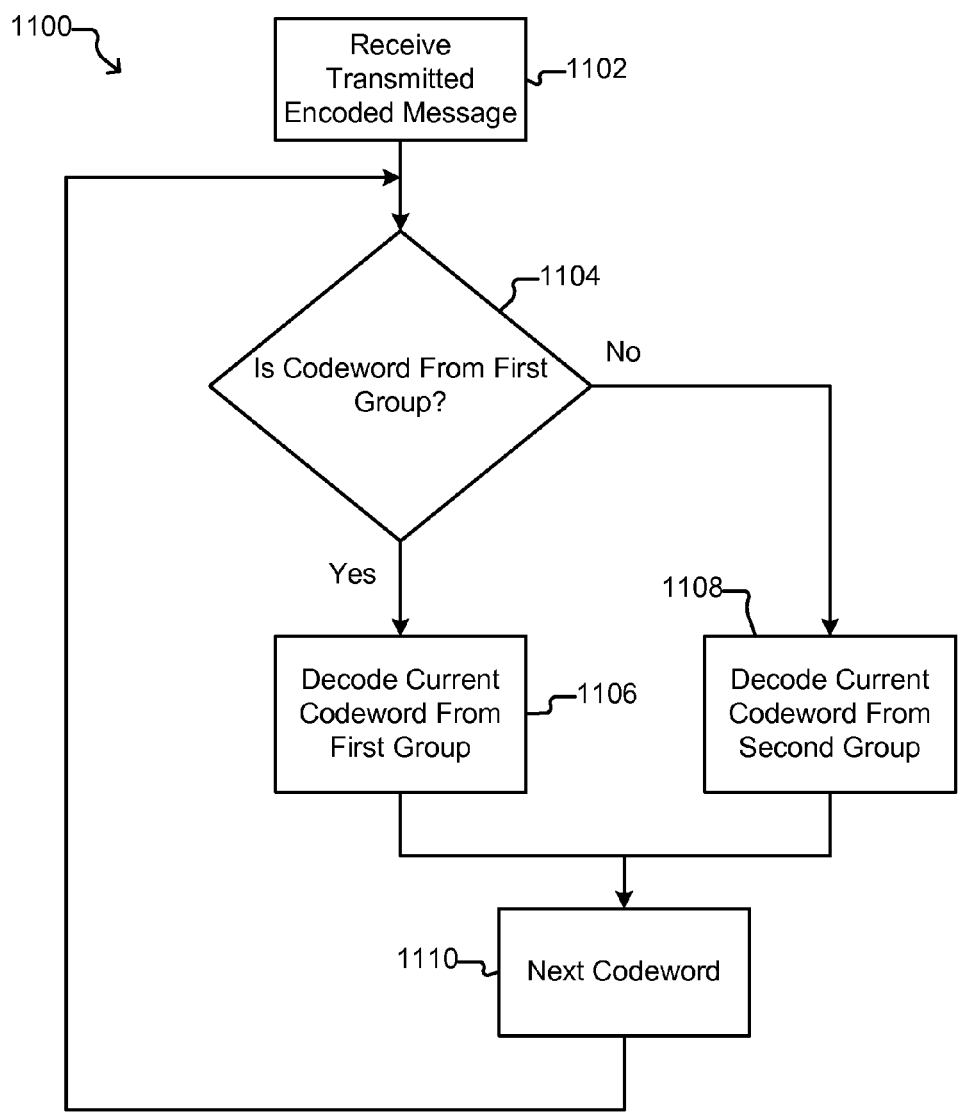
FIG. 11 illustrates an example of a process for decoding an encoded message encoded using asymmetric distance coding according to some embodiments of the invention.

A general example of asymmetric distance coding has been described with respect to FIGS. 3-5 according to some embodiments of the invention, and a specific example of asymmetric distance coding illustrated in FIGS. 3-5 has been illustrated in and described with respect to FIG. 6 according to some embodiments of the invention. Attention is now turned to encoding and decoding processes for asymmetric distance coding. FIG. 7 illustrates a process for encoding with asymmetric coding a message prior to transmission of the message, and FIG. 11 shows a process for decoding the transmitted message.

Turning first to the encoding process 700 illustrated in FIG. 7, it is initially noted that the encoding process 700 of FIG. 7 can be performed by the encoder 106 of the communications system 100 of FIG. 1. For example, the process 700 can be performed by software, firmware, or the like stored in memory 110 and executed by the processor 108. Alternatively, the process 700 can be performed by hardwired circuitry (not shown) of the encoder 108. As yet another alternative, the process 700 can be performed by a combination of software, firmware, or the like in the memory 110 executed by the processor 108 and hardwired circuitry (not shown) of the encoder 108.

Referring to FIG. 7, the encoder 106 of FIG. 1 can receive at step 702 the message 104. As shown in FIG. 2 and discussed above, the message 104 can comprise datawords DW each of which can be one of the datawords $DW_0 \ldots DW_n$ of dataword set 202.

At steps 704 and 708, the encoder 106 can encode the datawords DW in the message 104. As shown by step 704, the encoder 106 can encode datawords DW in the message 104 that are in the first dataword group 304 into corresponding codewords CW in the first codeword group 308 of the codeword set 302. (See FIGS. 3-5.) As discussed above with respect to FIGS. 3-5, the datawords $DW_1, DW_3$, and $DW_n$ in the first dataword group 304 have a relatively high susceptibility to transmission errors, and the first codeword group 308 (consisting of $CW_1, CW_3$, and $CW_n$) has a relatively high minimum coding distance. In fact, the minimum coding distance of the first codeword group 308 can be sufficiently great to meet system requirements for detecting and, in some embodiments, also correcting transmission errors given the relatively high susceptibility to transmission errors of the datawords $DW_1$, $DW_3$, and $DW_n$ in the first dataword group 304.

As shown by step 706, the encoder 106 can encode datawords DW in the message 104 that are in the second dataword group 306 into corresponding codewords CW in the second codeword group 310 of the codeword set 302. (See FIGS. 3-5.) As discussed above with respect to FIGS. 3-5, the datawords $DW_0$, $DW_2$, $DW_4 \ldots DW_{n-1}$ in the second dataword group 306 have a relatively low susceptibility to transmission errors, and the second codeword group 310 (consisting of $CW_0, CW_2, CW_4 \ldots CW_{n-1}$) has a relatively small minimum coding distance. In fact, the minimum coding distance of the second codeword group 310 can be small enough for more (and in some embodiments, many more) codewords CW in the codeword space 402 (see FIG. 4) than are in the first codeword group 308 while still being large enough to meet system requirements for detecting and, in some embodiments, also correcting transmission errors given the relatively low susceptibility to transmission errors of the datawords $DW_1$, $DW_3$, and $DW_n$ in the second dataword group 306.

Thus, as discussed above with respect to FIGS. 3-5, the encoder 106 can encode at step 704 datawords $DW_1$, $DW_3$, and $DW_n$ that have a susceptibility to transmission errors that exceeds a predetermined threshold value (e.g., a corresponding signal-to-noise ratio that is less than a threshold signal-to-noise ratio) into the codewords $CW_1, CW_3$, and $CW_n$ of the first codeword group 308 having the minimum coding distance 404 illustrated in FIG. 4 and the bit gaps 420 and 422 with respect to the second codeword group 310 as illustrated in FIG. 5. Also as discussed above with respect to FIGS. 3-5, the encoder 106 can encode at step 706 datawords $DW_0$, $DW_2, DW_4 \ldots DW_{n-1}$ that have a susceptibility to transmission errors that is less than a predetermined threshold value (e.g., a corresponding signal-to-noise ratio that is greater than a threshold signal-to-noise ratio) into the codewords $CW_0$, $CW_2, CW_4 \ldots CW_{n-1}$ of the second codeword group 310 having the minimum coding distance 406 illustrated in FIG. 4 and the bit gaps 420 and 422 with respect to the first codeword group 308 as illustrated in FIG. 5.

Steps 704 and 706 are illustrated in FIG. 7 as separate steps for ease of illustration. In practice, the encoder 106 can perform steps 704 and 706 in a different order or simultaneously. For example, the encoder 106 can perform step 704 partially to encode one or more but less than all of the datawords DW from the first dataword group 304 in the message 104 received at step 702; the decoder can perform step 706 partially to encode one or more but less than all of the datawords DW from the second dataword group 306 in the message 104 received at step 702; and the encoder 106 can repeat the foregoing until all of the datawords DW in the message 104 are encoded.

Regardless, the encoder 106 can encode each dataword DW at step 704 or 706 generally as discussed above. For example, each dataword $DW_0 \ldots DW_n$ in the dataword set 202 can be stored in a table in, for example, the digital memory 110 (see FIG. 1) with the corresponding codeword set 302 $CW_0 \ldots CW_n$. The encoder 106 can perform the encoding steps 704 and/or 706 by looking the dataword DW to be encoded up in the table and encoding the dataword DW into the corresponding codeword CW in the table. As other examples, the encoder 106 can encode each dataword $DW_0 \ldots DW_n$ in the dataword set 202 into a corresponding CW0 . . . CWn at steps 704 and 706 using a linear block coding algorithm, a convolution coding algorithm, and/or a combination of the foregoing.

The foregoing describes the process 700 of FIG. 7 encoding according to the embodiment of the asymmetric coding scheme illustrated in FIGS. 3-5. The following is a description of the process 700 of FIG. 7 encoding the more specific example of an asymmetric coding scheme illustrated in FIG. 6.

Referring to FIG. 7, at step 702, the encoder 106 can receive the message 104 generally as discussed above.

At step 704, the decoder 106 can encode datawords DW in the message 104 that are in the first dataword group 304', which as discussed above consist of datawords $DW_0$ and $DW_n$. As discussed above with respect to FIG. 6, the first codeword group 308' of the corresponding codeword set 302' consists of a codeword $CW_0$ all of whose bits are "ones" and a codeword $CW_n$ all of whose bits are "zeros." The step 704 can comprise simply encoding any instance of the dataword $DW_0$ in the message 104 as the codeword $CW_0$ and any instance of the dataword $DW_n$ as the codeword $CW_n$.

At step 706, the encoder 106 can encode datawords DW in the message 104 that are in the second dataword group 306', which as discussed above consist of datawords $DW_1$, $DW_2 \ldots DW_{n-1}$. As illustrated in and discussed above with respect to FIG. 6, each of the datawords $DW_1, DW_2 \ldots DW_{n-1}$ can consist of bit blocks $CWB_0, CWB_1 \ldots CWB_x$ having the characteristics discussed above.

Figure 8:
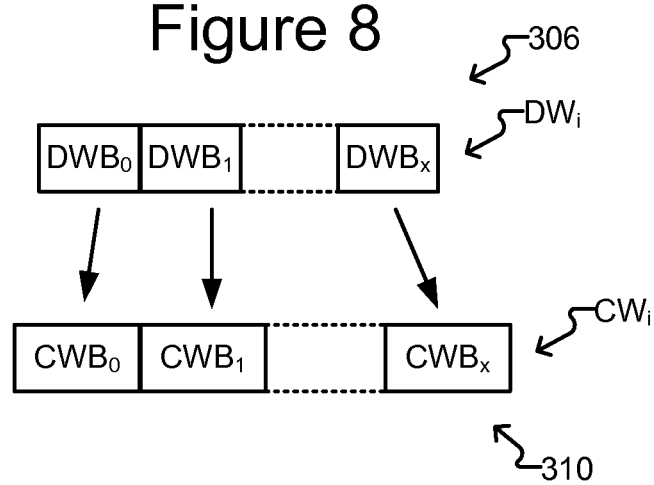
FIG. 8 illustrates an example of asymmetric distance coding in which each codeword comprises multiple bit blocks each with an equal number of ones and zeros according to some embodiments of the invention.
Figure 9:
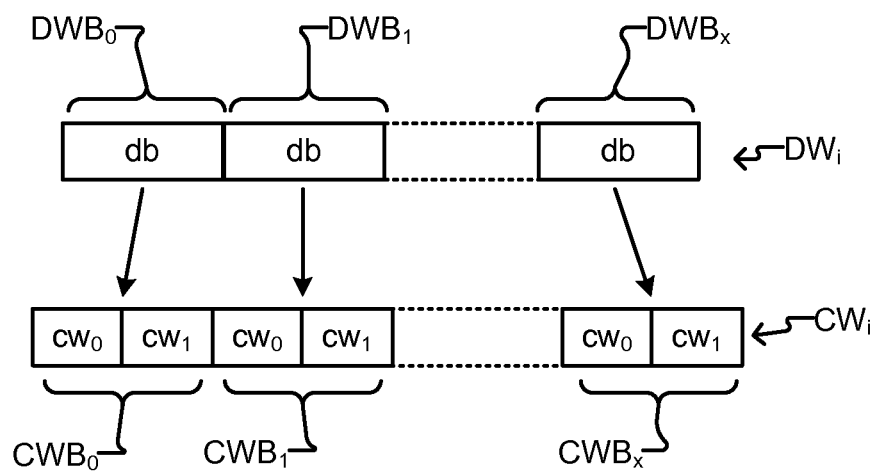
FIG. 9 shows an example of asymmetric distance coding in which each bit block of a codeword consists of a pair of bits that correspond to one bit of a dataword according to some embodiments of the invention.

The encoder 106 can perform step 706 for each dataword $DW_1, DW_2 \ldots DW_{n-1}$ of the second dataword group 306' by translating corresponding bit blocks of the dataword DW into the bit blocks $CWB_0, CWB_1 \ldots CWB_x$ of the codeword as illustrated in FIG. 8, which shows an example of encoding one of the datawords $DW_i$ of the second dataword group 306' into a corresponding codeword $CW_i$ of the second codeword group '310. In FIG. 8, the dataword $DW_i$ can be any of the datawords $DW_1, DW_2 \ldots DW_{n-1}$ of the second dataword group 306', and $CW_i$ can be the corresponding one of the codewords of the codewords $CW_1, CW_2 \ldots CW_{n-1}$ of the second codeword group 310'. As shown, bit blocks $DWB_0$, $DWB_1 \ldots DWB_x$ of the dataword $DW_i$ are encoded into corresponding bit blocks $CWB_0, CWB_1 \ldots CWD_x$ of the codeword $CW_i$. FIG. 9 illustrates a first example, and FIG. 10 shows a second example.

In the example illustrated in FIG. 9, each bit block $DWB_0$, $DWB_1 \ldots DWB_x$ of the dataword $DW_i$ is one bit db, and each bit block $CWB_0, CWB_1 \ldots CWB_x$ of the codeword $CW_i$ is two bits $cw_a$ and $cw_b$. The dataword DWi can be encoded into the codeword CDi by encoding each bit db of the dataword $DW_i$ (corresponding to one of the bit blocks $DWB_0$, $DWB_1 \ldots DWB_x$) into a corresponding bit pair $cw_0$ and $cw_1$ of the codeword $CW_i$ (corresponding to one of the bit blocks $CWB_0, CWB_1 \ldots CWB_x$) as shown. For example, each bit db of the dataword $DW_i$ that is a "zero" can be encoded into a pair $cw_0$ and $cw_1$ having "zero, one" values, and each bit db of the dataword $DW_i$ that is a "one" can be encoded into a pair $cw_0$ and $cw_1$ having "one, zero" values.

Figure 10:
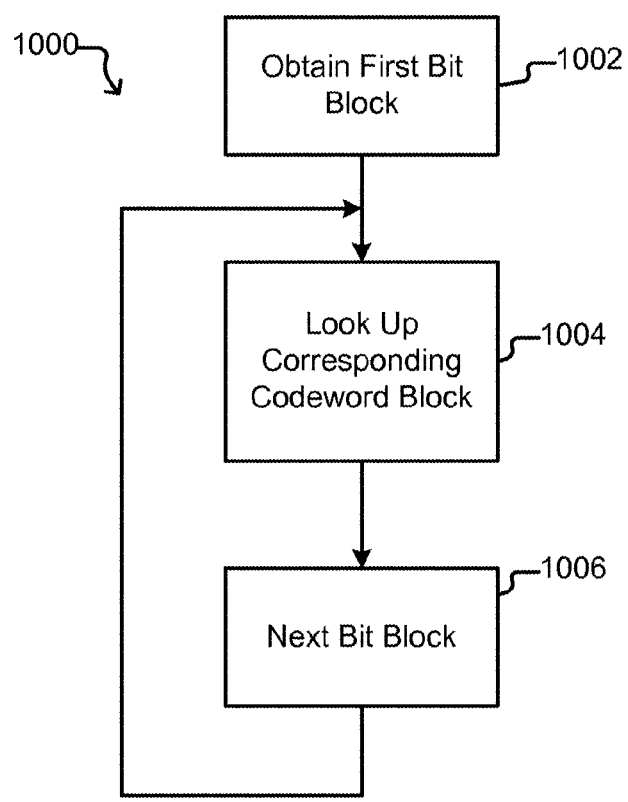
FIG. 10 illustrates an example process for performing the encoding step of FIG. 7 in which block bits of the dataword are translated into block bits of the codeword of FIG. 8 according to some embodiments of the invention.

As noted, FIG. 10 illustrates another example of a process for encoding the dataword $DW_i$ into the codeword $CW_i$ of FIG. 8. For ease of illustration and discussion, the example process 1000 of FIG. 10 is discussed below with regard to an example in which each bit block $DWB_0, DWB_1 \ldots DWB_x$ of the dataword $DW_i$ of FIG. 8 is six bits, and each bit block $CWB_0, CWB_1 \ldots CWB_x$ of the codeword $CW_i$ is eight bits. Table 1 below maps each of the sixty-four possible values (which are integer values in Table 1 below for ease of presentation and discussion) of a six-bit bit block $DWB_0$, $DWB_1 \ldots DWB_x$ of the dataword $DW_i$ into a corresponding eight-bit pattern in which the number of "ones" and "zeros" is equal for the codeword $CW_i$ bit blocks $CWB_0$, $CWB_1 \ldots CWB_x$. Table 1 can be stored as digital data in the memory 110 and/or the memory 132 of FIG. 1.

TABLE 1

| Dataword Bit Block ($DWB_0$, $DWB_1 \ldots DWB_x$) | Codeword Bit Block ($CWB_0$, $CWB_1 \ldots CWB_x$) | | | | | | | |
|---|---|---|---|---|---|---|---|---|
| | $bit_0$ | $bit_1$ | $bit_2$ | $bit_3$ | $bit_4$ | $bit_5$ | $bit_6$ | $bit_7$ |
| 0  | 1 | 1 | 1 | 1 | 0 | 0 | 0 | 0 |
| 1  | 1 | 1 | 1 | 0 | 1 | 0 | 0 | 0 |
| 2  | 1 | 1 | 1 | 0 | 0 | 1 | 0 | 0 |
| 3  | 1 | 1 | 1 | 0 | 0 | 0 | 1 | 0 |
| 4  | 1 | 1 | 1 | 0 | 0 | 0 | 0 | 1 |
| 5  | 1 | 1 | 0 | 1 | 1 | 0 | 0 | 0 |
| 6  | 1 | 1 | 0 | 1 | 0 | 1 | 0 | 0 |
| 7  | 1 | 1 | 0 | 1 | 0 | 0 | 1 | 0 |
| 8  | 1 | 1 | 0 | 1 | 0 | 0 | 0 | 1 |
| 9  | 1 | 1 | 0 | 0 | 1 | 1 | 0 | 0 |
| 10 | 1 | 1 | 0 | 0 | 1 | 0 | 1 | 0 |
| 11 | 1 | 1 | 0 | 0 | 1 | 0 | 0 | 1 |
| 12 | 1 | 1 | 0 | 0 | 0 | 1 | 1 | 0 |
| 13 | 1 | 1 | 0 | 0 | 0 | 1 | 0 | 1 |
| 14 | 1 | 1 | 0 | 0 | 0 | 0 | 1 | 1 |
| 15 | 1 | 0 | 1 | 1 | 1 | 0 | 0 | 0 |
| 16 | 1 | 0 | 1 | 1 | 0 | 1 | 0 | 0 |
| 17 | 1 | 0 | 1 | 1 | 0 | 0 | 1 | 0 |
| 18 | 1 | 0 | 1 | 1 | 0 | 0 | 0 | 1 |
| 19 | 1 | 0 | 1 | 0 | 1 | 1 | 0 | 0 |
| 20 | 1 | 0 | 1 | 0 | 1 | 0 | 1 | 0 |
| 21 | 1 | 0 | 1 | 0 | 1 | 0 | 0 | 1 |
| 22 | 1 | 0 | 1 | 0 | 0 | 1 | 1 | 0 |
| 23 | 1 | 0 | 1 | 0 | 0 | 1 | 0 | 1 |
| 24 | 1 | 0 | 1 | 0 | 0 | 0 | 1 | 1 |
| 25 | 1 | 0 | 0 | 1 | 1 | 1 | 0 | 0 |
| 26 | 1 | 0 | 0 | 1 | 1 | 0 | 1 | 0 |
| 27 | 1 | 0 | 0 | 1 | 1 | 0 | 0 | 1 |
| 28 | 1 | 0 | 0 | 1 | 0 | 1 | 1 | 0 |
| 29 | 1 | 0 | 0 | 1 | 0 | 1 | 0 | 1 |
| 30 | 1 | 0 | 0 | 1 | 0 | 0 | 1 | 1 |
| 31 | 1 | 0 | 0 | 0 | 1 | 1 | 1 | 0 |
| 32 | 1 | 0 | 0 | 0 | 1 | 1 | 0 | 1 |
| 33 | 1 | 0 | 0 | 0 | 1 | 0 | 1 | 1 |
| 34 | 1 | 0 | 0 | 0 | 0 | 1 | 1 | 1 |
| 35 | 0 | 1 | 1 | 1 | 1 | 0 | 0 | 0 |
| 36 | 0 | 1 | 1 | 1 | 0 | 1 | 0 | 0 |
| 37 | 0 | 1 | 1 | 1 | 0 | 0 | 1 | 0 |
| 38 | 0 | 1 | 1 | 1 | 0 | 0 | 0 | 1 |
| 39 | 0 | 1 | 1 | 0 | 1 | 1 | 0 | 0 |
| 40 | 0 | 1 | 1 | 0 | 1 | 0 | 1 | 0 |
| 41 | 0 | 1 | 1 | 0 | 1 | 0 | 0 | 1 |
| 42 | 0 | 1 | 1 | 0 | 0 | 1 | 1 | 0 |
| 43 | 0 | 1 | 1 | 0 | 0 | 1 | 0 | 1 |
| 44 | 0 | 1 | 1 | 0 | 0 | 0 | 1 | 1 |
| 45 | 0 | 1 | 0 | 1 | 1 | 1 | 0 | 0 |
| 46 | 0 | 1 | 0 | 1 | 1 | 0 | 1 | 0 |
| 47 | 0 | 1 | 0 | 1 | 1 | 0 | 0 | 1 |
| 48 | 0 | 1 | 0 | 1 | 0 | 1 | 1 | 0 |
| 49 | 0 | 1 | 0 | 1 | 0 | 1 | 0 | 1 |
| 50 | 0 | 1 | 0 | 1 | 0 | 0 | 1 | 1 |
| 51 | 0 | 1 | 0 | 0 | 1 | 1 | 1 | 0 |
| 52 | 0 | 1 | 0 | 0 | 1 | 1 | 0 | 1 |
| 53 | 0 | 1 | 0 | 0 | 1 | 0 | 1 | 1 |
| 54 | 0 | 1 | 0 | 0 | 0 | 1 | 1 | 1 |
| 55 | 0 | 0 | 1 | 1 | 1 | 1 | 0 | 0 |
| 56 | 0 | 0 | 1 | 1 | 1 | 0 | 1 | 0 |
| 57 | 0 | 0 | 1 | 1 | 1 | 0 | 0 | 1 |
| 58 | 0 | 0 | 1 | 1 | 0 | 1 | 1 | 0 |
| 59 | 0 | 0 | 1 | 1 | 0 | 1 | 0 | 1 |
| 60 | 0 | 0 | 1 | 1 | 0 | 0 | 1 | 1 |
| 61 | 0 | 0 | 1 | 0 | 1 | 1 | 1 | 0 |
| 62 | 0 | 0 | 1 | 0 | 1 | 1 | 0 | 1 |
| 63 | 0 | 0 | 1 | 0 | 1 | 0 | 1 | 1 |

Referring to the process 1000 of FIG. 10, the encoder 106 can obtain at step 1002 the first bit block $DWB_0$ of the dataword $DW_i$. At step 1004, the encoder 106 can look up the value of the six-bit bit block $DWB_0$ in Table 1 and translate the bit block $DWB_0$ into the correspond eight bit pattern for the codeword $CW_i$ bit block $CWB_0$. For example, if the integer value of the six-bit bit block $DWB_0$ is "11," the corresponding eight bit pattern obtained at step 1004 for the codeword $CW_i$ bit block $CWB_0$ is "1, 1, 0, 0, 1, 0, 0, 1." At step 1006, the encoder 106 obtains the next bit block $DWB_1$ of the dataword $DW_i$ and repeats step 1004 for the bit block $DWB_1$. For example, if the integer value of the six-bit bit block $DWB_1$ is "59," the corresponding eight bit pattern obtained at step 1004 for the codeword $CW_i$ bit block $CWB_1$ is "0, 0, 1, 1, 0, 1, 0, 1." The encoder 106 then repeats steps 1006 and 1004 for each of the remaining bit blocks of the dataword $DW_i$. Once the last bit block $DW_n$ of the dataword $DW_i$ is processed at step 1004 (for example, if the integer value of the six-bit bit block $DWB_x$ is "32," the corresponding eight bit pattern obtained at step 1004 for the codeword $CW_i$ bit block $CWB_x$ is "1, 0, 0, 0, 1, 1, 0, 1"), the dataword $DW_i$ has been encoded as the codeword $CW_n$ and the process 1000 can terminate.

Referring again to FIG. 7, after the encoder 106 encodes all of the datawords DW in the message 104 into codewords CW at steps 704 and 706 (e.g., in accordance with any of the examples discussed above) and thus completes process 700, the encoder 106 can output the encoded message 112 to the transmitter 114. The transmitter 114 can then transmit the encoded message 112 through the transmission medium 118 to the receiving device 122. The receiver 124 can receive the transmission and output the received encoded message 126 to the decoder 130.

As noted above, the process 1100 of FIG. 11 can be used to decode the received encoded message 126. The decoding process 1100 of FIG. 11 can be performed by the decoder 128 of the communications system 100 of FIG. 1. For example, the process 1100 can be performed by software, firmware, or the like stored in memory 132 and executed by the processor 130. Alternatively, the process 1100 can be performed by hardwired circuitry (not shown) of the decoder 128. As yet another alternative, the process 1100 can be performed by a combination of software, firmware, or the like in the memory 132 executed by the processor 130 and hardwired circuitry (not shown) of the decoder 128.

The decoder 128 of FIG. 1 can receive at step 1102 of FIG. 11 the received encoded message 126. As shown in FIG. 2 and discussed above, the message 126 can comprise received codewords RCW each of which can be a received one of the codewords CW of the encoded message 112. One or more of the received codewords RCW may contain transmission errors.

Referring again to FIG. 11, each received codeword RCW in the encoded message 126 can then be decoded by the decoder 128 in accordance with steps 1104 through 1108 of FIG. 11. That is, at step 1104, the decoder 128 can determine whether a received codeword RCW corresponds to a codeword CW in the first codeword group 308 or the second codeword group 310 of the codeword set 302. This can be accomplished, for example, by determining whether the number of bits in the predetermined state (e.g., "ones") of the received codeword RCW is on or between the upper test boundary 424 and lower test boundary 426 as shown in and discussed above with respect to FIG. 5. If the received codeword RCW is not between the upper test boundary 424 and lower test boundary 426, the received codeword RCW corresponds to a codeword CW in the first codeword group 308. If the received codeword RCW is between the upper test boundary 424 and lower test boundary 426, the received codeword RCW corresponds to a codeword CW in the second codeword group 310.

At step 1106, the decoder 128 can decode the received codewords RCW in the encoded message 126 that are in the first codeword group 308 into corresponding datawords DW in the first dataword group 304 of the dataword set 202. At step 1108, the decoder 128 can decode received codewords RCW in the encoded message 126 that are in the second codeword group 310 into corresponding datawords DW in the second dataword group 306 of the dataword set 202.

At step 1106 or 1108, each received codeword RCW can be decoded using any suitable error detection and, optionally correcting, algorithm that is compatible with the manner in which the codeword CW was encoded by the encoder 106 per the process 700 of FIG. 7. For example, if the codewords CW were encoded using a linear block encoding algorithm, an inverse of the encoding algorithm can be used to decode each received codeword RCW into corresponding datawords DW. As another example, if the codewords CW were encoded using a convolution encoding algorithm, an inverse of the encoding algorithm (e.g., a Viterbi algorithm) can be used to decode each received codeword RCW into corresponding datawords DW.

Referring again to FIG. 11, as implied by step 1110, all the received codewords RCW in the encoded message 126 received at step 802 can be encoded by repeating steps 1104 through 1108 for each of the received codewords RCW in the encoded message 126.

The foregoing describes the process 1100 of FIG. 11 decoding according to the embodiment of the asymmetric coding scheme illustrated in FIGS. 3-5. The following is a description of the process 1100 of FIG. 11 decoding the more specific example of an asymmetric coding scheme illustrated in FIG. 6.

Referring to FIG. 11, at step 1102, the decoder 128 can receive as input the encoded message 126 generally as discussed above. At step 1104, the decoder 128 can make a hard decision regarding the state of each bit of the received codeword RCW being decoded. Also as part of step 1104, the decoder 128 can determine whether the number of bits in the received codeword RCW is greater than the upper test boundary 424' or less than the lower test boundary 426'. As discussed above with respect to FIG. 6, the first upper bit boundary 412' can be "m" bits, the first lower bit boundary 414' can be zero bits, and the second upper bit boundary 416' and the second lower bit boundary 418' can both be m/2 bits. The upper bit gap 420' can thus be m/2 bits, and the lower bit gap 422' can also be m/2 bits. In some embodiments, the upper test boundary 424' can be the second upper bit boundary 416' plus an integer A, and the lower test boundary 426' can be the first lower bit boundary 414' plus an integer B. The integers A and B can be the same or different. Example values of the integers A and B include m/4, m/4 plus or minus one bit, m/4 plus or minus two bits, m/4 plus or minus three bits, m/4 plus or minus four bits, m/4 plus or minus five bits, or the like.

If the decoder 128 determines at step 1104 that the number of bits in the received codeword RCW is greater than the upper test boundary 424', the decoder 128 determines that the received codeword RCW is the codeword $CW_0$ in the first codeword group 308' and decodes the received codeword RCW into the dataword $DW_0$. If the decoder 128 determines at step 1104 that the number of bits in the received codeword RCW is less than the lower test boundary 424', the decoder 128 determines that the received codeword RCW is the codeword $CW_n$ in the first codeword group 308' and decodes the received codeword RCW into the dataword $DW_0$.

If, however, the decoder 128 determines at step 1104 that the number of bits in the received codeword RCW is on or between the upper test boundary 424' and the lower test boundary 426', the decoder 128 proceeds to step 1108 to decode the received codeword RCW as a codeword $CW_1$, $CW_2$ ... $CW_{n-1}$ of the second codeword group 310'. As illustrated in and discussed above with respect to FIG. 6, each of the codewords $CW_1$, $CW_2$ ... $CW_{n-1}$ of the second codeword group 310' consist of bit blocks $CWB_0$, $CWB_1$ ... $CWB_x$ having the characteristics discussed above.

Figure 12:
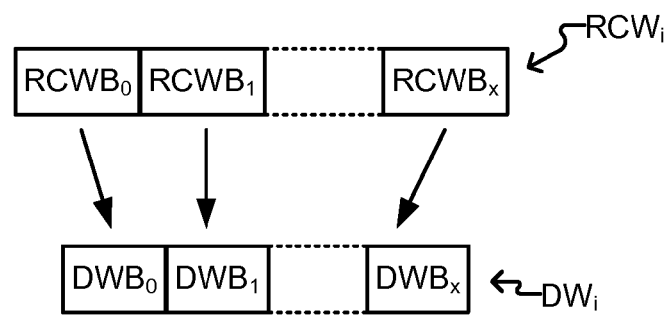
FIG. 12 illustrates an example of decoding a codeword encoded as shown in FIG. 8 according to some embodiments of the invention.
Figure 13:
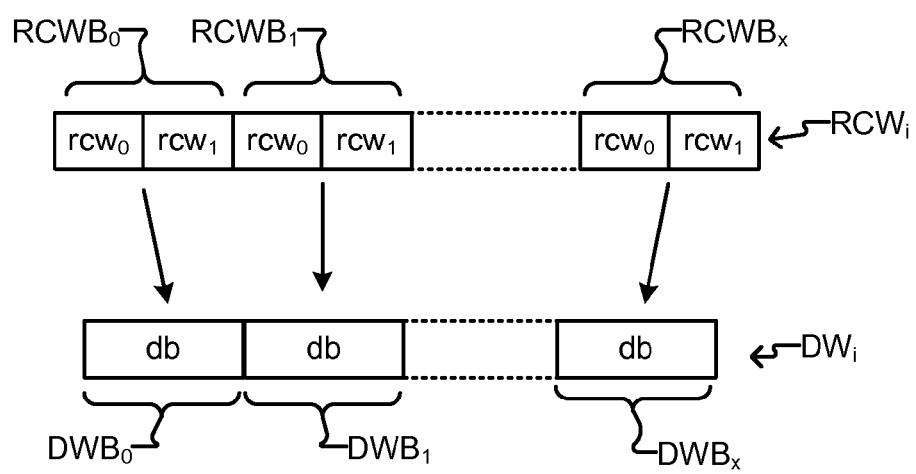
FIG. 13 shows an example of decoding a codeword encoded as shown in FIG. 9 according to some embodiments of the invention.

As illustrated in FIG. 12, step 1108 can be performed for each received codeword RCW in the encoded message 126 by translating bit blocks $RCWB_0$, $RCWB_1$ ... $RCWB_x$ of the received codeword RCW into the bit blocks $DWB_0$, $DWB_1$ ... $DWB_x$ of a corresponding dataword DW. That is, the decoder 128 can decode at step 1108 a received codeword $RCW_i$ identified at step 1104 of FIG. 11 as corresponding to a codeword $CW_1$, $CW_2$ ... $CW_{n-1}$ of the second codeword group 310' can be decoded into a corresponding dataword $DW_i$ by dividing the received codeword $RCW_i$ into bit blocks $RCWB_0$, $RCWB_1$ ... $RCWB_x$ that are the same bit length as the bit blocks $CWB_0$, $CWB_1$ ... $CWB_x$ of the codewords CW of the encoded message 112 as shown in FIG. 8. FIG. 13 illustrates a first example, and FIG. 14 shows a second example.

In the example illustrated in FIG. 13, the received codeword RCWi was encoded according to the encoding illustrated in and discussed above with respect to FIG. 9. Thus, each bit block $RCWB_0$, $RCWB_1$ ... $RCWB_x$ of the received codeword $RCW_i$ consists of a pair of bits $rcw_0$ (which is the received version of a bit $cw_0$ in FIG. 9) and $rcw_1$ (which is the received version of a bit $cw_1$ in FIG. 9). The received codeword RCWi can be decoded to the dataword DWi by decoding each bit pair $rcw_0$ and $rcw_1$ (which can be hard or soft bits) of the received codeword $RCW_i$ into a corresponding bit db of the dataword $DW_i$ as illustrated in FIG. 13.

Table 2 below illustrates an example of a decoding technique that can be used to decode each pair of bits $rcw_0$ and $rcw_1$ to a corresponding bit db of the dataword $DW_i$. That is, where $v_0$ is the voltage of the $rcw_0$ bit; $v_1$ is the voltage of the $rcw_1$ bit; $V_d$ is a decision voltage such that a voltage for a bit $rcw_0$ or $rcw_1$ that is less than ($<$) $V_d$ corresponds to "zero" and a voltage for a bit $rcw_0$ or $rcw_1$ that is greater than or equal to ($\geq$) $V_d$ corresponds to "one"; $|v_0|$ means the absolute value of $v_0$; and $|v_1|$ means the absolute value of $v_1$.

TABLE 2

| If $v_1$ and $v_1$ are: | Then db is: |
|---|---|
| $v_0 < V_d$ and $v_1 \geq V_d$ | 0 |
| $v_0 \geq V_d$ and $v_1 < V_d$ | 1 |
| $v_0 \geq V_d$ and $v_1 \geq V_d$ and $|v_0| \geq |v_1|$ | 1 |
| $v_0 \geq V_d$ and $v_1 \geq V_d$ and $|v_0| < |v_1|$ | 0 |
| $v_0 < V_d$ and $v_1 < V_d$ and $|v_0| \geq |v_1|$ | 0 |
| $v_0 < V_d$ and $v_1 < V_d$ and $|v_0| < |v_1|$ | 1 |

FIG. 14 illustrates an example of a process 1400 for decoding the received codeword $RCW_i$ of FIG. 12 where the codeword $CW_i$ was encoded by the encoder 106 per the process 1000 of FIG. 10. FIG. 14 is thus an example of performing step 1108 of FIG. 11 where the corresponding codeword $CW_i$ was encoded as discussed above with respect to FIG. 10, each bit block $CWB_0$, $CWB_1$ ... $CWB_x$ of the codeword $CW_i$ of FIG. 8 is eight bits. In the example corresponding to FIG. 14, the received bit blocks $RCWB_0$, $RCWB_1$ ... $RCWB_x$ of the codeword $RCW_i$ of FIG. 12 are thus also eight bits.

Referring to the process 1400 of FIG. 14, the first bit block $RCWB_0$ of the received codeword $RCW_i$ can be obtained at step 1402 by the decoder 128. At step 1404, the decoder 128 can calculate the Euclidian distance between the numerical value of the bits of the first bit block $RCWB_0$ and each of the possible eight-bit codeword bit blocks in Table 1 above (which can be stored in the memory 132 of FIG. 1). The possible eight-bit codeword bit block in Table 1 with the smallest Euclidian distance to the first bit block $RCWB_0$ of the received codeword $RCW_i$ is the most likely value of the first bit block $CWB_0$ as originally coded by the encoder 106. Consequently, at step 1406, the decoder 128 selects the eight-bit codeword bit block in the Table 1 above that has the smallest Euclidian distance calculated at step 1404. At step 1408, the decoder 128 can look up the value of the six-bit bit block $DWB_0$ in Table 1 above that corresponds to the eight-bit codeword bit block of Table 1 selected at step 1406 and translate the first block $RCWB_0$ of the codeword $RCW_i$ into the looked-up value of the six-bit bit block $DWB_0$. For example, if the decoder 128 selects at step 1406 the eight-bit codeword bit block in Table 1 "0, 1, 1, 1, 1, 0, 0, 0," the decoder 128 would find "35" as the corresponding value in Table 1 for the first bit block $DWB_0$ of the dataword $DW_i$. Rather than calculating the Euclidian distances in step 1404, the decoder 128 can use correlation between the numerical value of the bits of the bit block RCWB0 and each of the possible eight-bit codeword bit blocks in Table 1 above.

The decoder 128 can then obtain at step 1410 the next bit block $RCWB_1$ of the received codeword $RCW_i$ and repeat steps 1404 through 1406 to translate the bit block $RCWB_1$ into a corresponding bit block $DWB_1$ of the dataword $DW_i$. The decoder 128 can repeat steps 1404 through 1410 for each of the remaining bit blocks of the received codeword $RCW_i$. Once the last bit block $RCW_x$ of the received codeword $RCW_i$ is processed at steps 1404 through 1408, the received codeword $RCW_i$ has been decoded to the dataword $DW_i$, and the process 1400 can terminate.

Referring again to FIGS. 1 and 11, the decoder 128 executing the process 1100 can output the decoded message 134.

Although specific embodiments and applications of the invention have been described in this specification, these embodiments and applications are exemplary only, and many variations are possible. For example, the codewords CW of the encoded message 112 can be further encoded with an outer code (e.g., a Reed-Muller outer code) before the encoded message 112 is transmitted by the transmitter 114. In such a case, the process of deciding the received RCW codewords of the received encoded message 126 can include decoding the outer code, for example, using majority rule decoding.

We claim:

1. A process of encoding datawords using asymmetric distance coding, said process comprising:
   receiving at an electronic encoder a message comprising datawords from a dataword set for transmission in an electronic transmission system, said dataword set comprising a first dataword group and a second dataword group;
   encoding with said electronic encoder ones of said datawords in said message that are in said first dataword group into corresponding codewords from a first codeword group of a codeword set, wherein said first codeword group has a first minimum coding distance; and
   encoding ones of said datawords of said message that are in said second dataword group into corresponding digital codewords from a second codeword group of said codeword set, wherein said second codeword group has a second minimum coding distance that is less than said first minimum coding distance,
   wherein:
      each said dataword in said first dataword group and said second dataword group consists of a unique pattern of the same number k of information bits,
      each said codeword in said first codeword group and said second codeword group consists of a unique pattern of the same number m of bits that encodes all of said k number of information bits of a corresponding one of said datawords in said first dataword group or said second dataword group, and
      wherein for each said codeword in said first codeword group and said second codeword group m is greater than k.

2. The process of claim 1, wherein a difference between said first minimum coding distance and said second minimum coding distance is at least five bits.

3. The process of claim 1, wherein said second minimum coding distance is less than eighty percent of said first minimum coding distance.

4. An encoder for encoding datawords of a dataword set for transmission in an electronic transmission system, said dataword set comprising a first dataword group and a second dataword group, said encoder comprising:
   an input for receiving a message comprising ones of said datawords;
   circuitry configured to:
      encode ones of said datawords in said message that are in said first dataword group into corresponding codewords from a first codeword group of a codeword set, wherein said first codeword group has a first minimum coding distance, and
      encode ones of said datawords of said message that are in said second dataword group into corresponding codewords from a second codeword group of said codeword set, wherein said second codeword group has a second minimum coding distance that is less than said first minimum coding distance; and
   an output for outputting an encoded message comprising said corresponding codewords, wherein:
      each said dataword in said first dataword group and said second dataword group consists of a unique pattern of the same number k of information bits,
      each said codeword in said first codeword group and said second codeword group consists of a unique pattern of the same number m of bits that encodes all of said k number of information bits of a corresponding one of said datawords in said first dataword group or said second dataword group, and
      wherein for each said codeword in said first codeword group and said second codeword group m is greater than k.

5. The encoder of claim 4, wherein said circuitry comprises:
   a digital memory for storing non-transitory machine readable instructions; and
   a processor configured to operate in accordance with said machine readable instructions.

6. The encoder of claim 4, wherein a difference between said first minimum coding distance and said second minimum coding distance is at least five bits.

7. The encoder of claim 4, wherein said second minimum coding distance is less than eighty percent of said first minimum coding distance.

8. A process of decoding a transmitted encoded message, said process comprising:

receiving an encoded message transmitted in an electronic transmission system, said encoded message comprising received codewords;

determining whether each of said received codewords is in a first codeword group of a codeword set or a second codeword group of said codeword set, wherein said first codeword group has a first minimum coding distance, said second codeword group has a second minimum coding distance, and said first minimum coding distance is greater than said second minimum coding distance;

decoding ones of said received codewords determined to be in said first codeword group into corresponding datawords in a first dataword group of a dataword set; and decoding ones of said received codewords determined to be in said second codeword group into corresponding datawords in a second dataword group of said dataword set, wherein:
each said dataword in said first dataword group and said second dataword group consists of a unique pattern of the same number k of information bits,
each said codeword in said first codeword group and said second codeword group consists of a unique pattern of the same number m of bits that encodes all of said k number of information bits of a corresponding one of said datawords in said first dataword group or said second dataword group, and
wherein for each said codeword in said first codeword group and said second codeword group m is greater than k.

9. The process of claim 8, wherein:
said pattern of each of said codewords in said first codeword group consists of a number of bits in a high state that is either greater than or equal to a first upper bit boundary or less than a first lower bit boundary;
said pattern of each of said codewords in said second codeword group consists of a number of bits in said high state that is between a second upper boundary and a second lower boundary;
said second upper boundary is greater than said second lower boundary but less than or equal to said first upper boundary; and
said second lower boundary is greater than said first lower boundary but less than said second upper boundary.

10. The process of claim 9, wherein said determining step comprises determining that one of said received codewords is in said first codeword group if a number of bits of said one of said received codewords in said high state is either:
greater than an upper test boundary between said first upper bit boundary and said second upper boundary, or less than a lower test boundary between said second lower bit boundary and said first lower bit boundary.

11. The process of claim 8, wherein a difference between said first minimum coding distance and said second minimum coding distance is at least five bits.

12. The process of claim 8, wherein said second minimum coding distance is less than eighty percent of said first minimum coding distance.

13. The process of claim 1, wherein:
said message further comprises additional multi-bit data blocks, and
said additional multi-bit data blocks are not encoded into any of said codewords of said codeword set.

14. The process of claim 1, wherein:
said encoding said datawords in said first dataword group comprises encoding each of said datawords in said first dataword group into said corresponding codewords from said first codeword group in accordance with a particular encoding algorithm; and
said encoding said datawords in said second dataword group comprises encoding each of said datawords in said second dataword group into said corresponding codewords of said second codeword group in accordance with said particular encoding algorithm.

15. The process of claim 1, wherein:
said first minimum coding distance is m, and
said second minimum coding distance is m/2.

16. The process of claim 1, wherein:
said dataword set is a closed set of datawords consisting solely of n said datawords; and
said codeword set is a closed set of codewords consisting solely of n said codewords each corresponding to one and only one of said n datawords.

17. The process of claim 1, wherein a susceptibility to transmission errors of each of said datawords in said first dataword group is greater than a susceptibility to transmission errors of each of said datawords in said second dataword group.

18. The process of claim 17, wherein said susceptibility to transmission errors of each said dataword corresponds to a signal-to-noise ratio of a waveform of said dataword.

19. The encoder of claim 4, wherein said circuitry is further configured to:
encode said datawords in said first dataword group into said corresponding codewords of said first codeword group utilizing a particular encoding algorithm; and
encode said datawords in said second dataword group into said corresponding codewords of said second codeword group utilizing said particular encoding algorithm.

20. The encoder of claim 4, wherein a susceptibility to transmission errors of each of said datawords in said first dataword group is greater than a susceptibility to transmission errors of each of said datawords in said second dataword group.

21. The encoder of claim 20, wherein said susceptibility to transmission errors of each said dataword corresponds to a signal-to-noise ratio of a waveform of said dataword.

22. The process of claim 8, wherein a susceptibility to transmission errors of each of said datawords in said first dataword group is greater than a susceptibility to transmission errors of each of said datawords in said second dataword group.

23. The process of claim 22, wherein said susceptibility to transmission errors of each said dataword corresponds to a signal-to-noise ratio of a waveform of said dataword.

* * * * *